(12) United States Patent
Oung et al.

(10) Patent No.: US 11,693,612 B1
(45) Date of Patent: Jul. 4, 2023

(54) METHODS, APPARATUSES, AND COMPUTER PROGRAM PRODUCTS FOR VERIFYING PRINTED INDICIA

(71) Applicant: Hand Held Products, Inc., Charlotte, NC (US)

(72) Inventors: Kar Boon Oung, Singapore (SG); WenWei Zhang, Singapore (SG); Thomas Axel Jonas Celinder, Singapore (SG); Christian Knut Schulz-Janisch, Singapore (SG); Kin Song Chan, Singapore (SG)

(73) Assignee: HAND HELD PRODUCTS, INC., Charlotte, NC (US)

( * ) Notice: Subject to any disclaimer, the term of this patent is extended or adjusted under 35 U.S.C. 154(b) by 0 days.

(21) Appl. No.: 17/805,189

(22) Filed: Jun. 2, 2022

(51) Int. Cl.
*G06F 3/12* (2006.01)
*G06T 7/13* (2017.01)
*G06T 7/00* (2017.01)
*G06K 1/12* (2006.01)

(52) U.S. Cl.
CPC .......... *G06F 3/1256* (2013.01); *G06F 3/1208* (2013.01); *G06K 1/121* (2013.01); *G06T 7/0004* (2013.01); *G06T 7/13* (2017.01); *G06T 2200/24* (2013.01); *G06T 2207/30144* (2013.01)

(58) Field of Classification Search
CPC ..... G06F 3/1256; G06F 3/1208; G06K 1/121; G06T 7/0004; G06T 7/13; G06T 2200/24; G06T 2207/30144

USPC ....................................................... 358/1.15
See application file for complete search history.

(56) References Cited

U.S. PATENT DOCUMENTS

| 6,560,741 | B1* | 5/2003 | Gerety | ............. G06K 19/06018 235/462.07 |
| 9,092,707 | B2 | 7/2015 | Slavin et al. | |
| 2015/0144692 | A1* | 5/2015 | Hejl | ......................... G06K 5/00 235/437 |

OTHER PUBLICATIONS

"DS9808 Digital Scanner Product Reference Guide," Zebra Technologies Corporation, 72E-112999-11, Revision A, 502 pgs, (May 2017).

* cited by examiner

*Primary Examiner* — Darryl V Dottin
(74) *Attorney, Agent, or Firm* — Alston & Bird LLP

(57) ABSTRACT

Example methods, systems, and apparatuses for verifying a printed indicium are provided. An example method may include receiving a captured image of a print media comprising the printed indicium; extracting a quiet zone grade portion from the captured image, where the quiet zone grade portion includes a printed indicium area of the printed indicium and at least one quiet zone area adjacent to the printed indicium area; in response to receiving a user input providing an overwrite quiet zone requirement indication and determining that the at least one quiet zone area does not satisfy at least one quiet zone requirement, causing at least one of adjusting the at least one quiet zone requirement to at least one reduced quiet zone requirement or adding at least one additional quiet zone area to the at least one quiet zone area.

20 Claims, 11 Drawing Sheets

METHODS, APPARATUSES, AND COMPUTER PROGRAM PRODUCTS FOR VERIFYING PRINTED INDICIA

TECHNICAL FIELD

Example embodiments of the present disclosure generally relate to printers. For example, various embodiments of the present disclosure provide example methods, apparatuses, and computer program products for verifying printed indicium or indicia.

BACKGROUND

Applicant has identified many technical challenges and difficulties associated with printers that print barcodes. For example, many printers fail to provide accurate evaluations of print qualities associated with the barcodes printed by the printers.

BRIEF SUMMARY

In general, embodiments of the present disclosure provide apparatuses, systems, methods, computer program products, and/or the like.

In accordance with some embodiments of the present disclosure, a computer-implemented method for verifying a printed indicium is provided. In some embodiments, the computer-implemented method comprises receiving, by a processor of a printing apparatus, a captured image of a print media comprising the printed indicium; extracting, by the processor of the printing apparatus, a quiet zone grade portion from the captured image, wherein the quiet zone grade portion comprises a printed indicium area of the printed indicium and at least one quiet zone area adjacent to the printed indicium area; in response to receiving a user input providing an overwrite quiet zone requirement indication and determining that the at least one quiet zone area does not satisfy at least one quiet zone requirement: causing, by the processor of the printing apparatus, at least one of adjusting the at least one quiet zone requirement to at least one reduced quiet zone requirement or adding at least one additional quiet zone area to the at least one quiet zone area, and generating, by the processor of the printing apparatus, at least one quiet zone grade associated with the at least one quiet zone area based at least in part on at least one of the at least one reduced quiet zone requirement or the at least one additional quiet zone area; and outputting, by the processor of the printing apparatus, verification results associated with the printed indicium based at least in part on the at least one quiet zone grade.

In some embodiments, the computer-implemented method further comprises identifying the printed indicium area from the captured image; identifying an indicium area edge of the printed indicium area; and determining a quiet zone requirement area adjacent to the indicium area edge based on a quiet zone requirement.

In some embodiments, the computer-implemented method further comprises setting the quiet zone grade portion based on the quiet zone requirement area.

In some embodiments, the computer-implemented method further comprises, in response to determining that the user input providing the overwrite quiet zone requirement indication is received, determining whether a print media edge of the print media is within the quiet zone requirement area adjacent to the indicium area edge.

In some embodiments, the computer-implemented method further comprises, in response to determining that at least one print media edge of the print media is within the quiet zone requirement area adjacent to the indicium area edge: adjusting the quiet zone requirement associated with a quiet zone area adjacent to the indicium area edge to a reduced quiet zone requirement, and generating a quiet zone grade based at least in part on the reduced quiet zone requirement. In some embodiments, the verification results indicate that the quiet zone grade is associated with an overwritten quiet zone requirement.

In some embodiments, the computer-implemented method further comprises, in response to determining that at least one print media edge of the print media is within the quiet zone requirement area adjacent to the indicium area edge: adding an additional quiet zone area to a quiet zone area adjacent to the indicium area edge, and generating a quiet zone grade based at least in part on the additional quiet zone area. In some embodiments, the verification results indicate that the quiet zone grade is associated with an overwritten quiet zone.

In some embodiments, the computer-implemented method further comprises, in response to determining that the print media edge of the print media is not within the quiet zone requirement area adjacent to the indicium area edge, generating a quiet zone grade indicating that a quiet zone area associated with the indicium area edge satisfies the quiet zone requirement. In some embodiments, the verification results indicate that the quiet zone grade is not associated with an overwritten quiet zone requirement and is not associated with an overwritten quiet zone adjacent to the indicium area edge.

In some embodiments, the computer-implemented method further comprises determining whether at least one print media edge of the print media is within the quiet zone requirement area adjacent to the indicium area edge.

In some embodiments, the computer-implemented method further comprises, in response to determining that the at least one print media edge of the print media is within the quiet zone requirement area, determining an area between the indicium area edge of the printed indicium area and the at least one print media edge of the print media as a quiet zone area associated with the indicium area edge.

In some embodiments, the computer-implemented method further comprises, in response to determining that the at least one print media edge of the print media is not within the quiet zone requirement area, determining the quiet zone requirement area as a quiet zone area associated with the indicium area edge.

In accordance with some embodiments of the present disclosure, an apparatus for verifying a printed indicium is provided. In some embodiments, the apparatus comprises at least one processor and at least one non-transitory memory comprising program code. In some embodiments, the at least one non-transitory memory and the program code are configured to, with the at least one processor, cause the apparatus to at least: receive a captured image of a print media comprising the printed indicium; extract a quiet zone grade portion from the captured image, wherein the quiet zone grade portion comprises a printed indicium area of the printed indicium and at least one quiet zone area adjacent to the printed indicium area; in response to receiving a user input providing an overwrite quiet zone requirement indication and determining that the at least one quiet zone area does not satisfy at least one quiet zone requirement: cause at least one of adjusting the at least one quiet zone requirement to at least one reduced quiet zone requirement or adding at least one additional quiet zone area to the at least one quiet zone area, and generate at least one quiet zone grade associated with the at least one quiet zone area based at least in part on at least one of the at least one reduced quiet zone requirement or the at least one additional quiet zone area; and output verification results associated with the printed indicium based at least in part on the at least one quiet zone grade.

In accordance with some embodiments of the present disclosure, a computer program product for verifying a printed indicium is provided. In some embodiments, the computer program product comprises at least one non-transitory computer-readable storage medium having computer-readable program code portions stored therein. In some embodiments, the computer-readable program code portions comprise an executable portion configured to: receive a captured image of a print media comprising the printed indicium; extract a quiet zone grade portion from the captured image, wherein the quiet zone grade portion comprises a printed indicium area of the printed indicium and at least one quiet zone area adjacent to the printed indicium area; in response to receiving a user input providing an overwrite quiet zone requirement indication and determining that the at least one quiet zone area does not satisfy at least one quiet zone requirement: cause at least one of adjusting the at least one quiet zone requirement to at least one reduced quiet zone requirement or adding at least one additional quiet zone area to the at least one quiet zone area, and generate at least one quiet zone grade associated with the at least one quiet zone area based at least in part on at least one of the at least one reduced quiet zone requirement or the at least one additional quiet zone area; and output verification results associated with the printed indicium based at least in part on the at least one quiet zone grade.

The foregoing illustrative summary, as well as other exemplary objectives and/or advantages of the present disclosure, and the manner in which the same are accomplished, are further explained within the following detailed description and its accompanying drawings.

BRIEF DESCRIPTION OF THE DRAWINGS

The description of the illustrative embodiments may be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION OF THE INVENTION

Figure 1A:
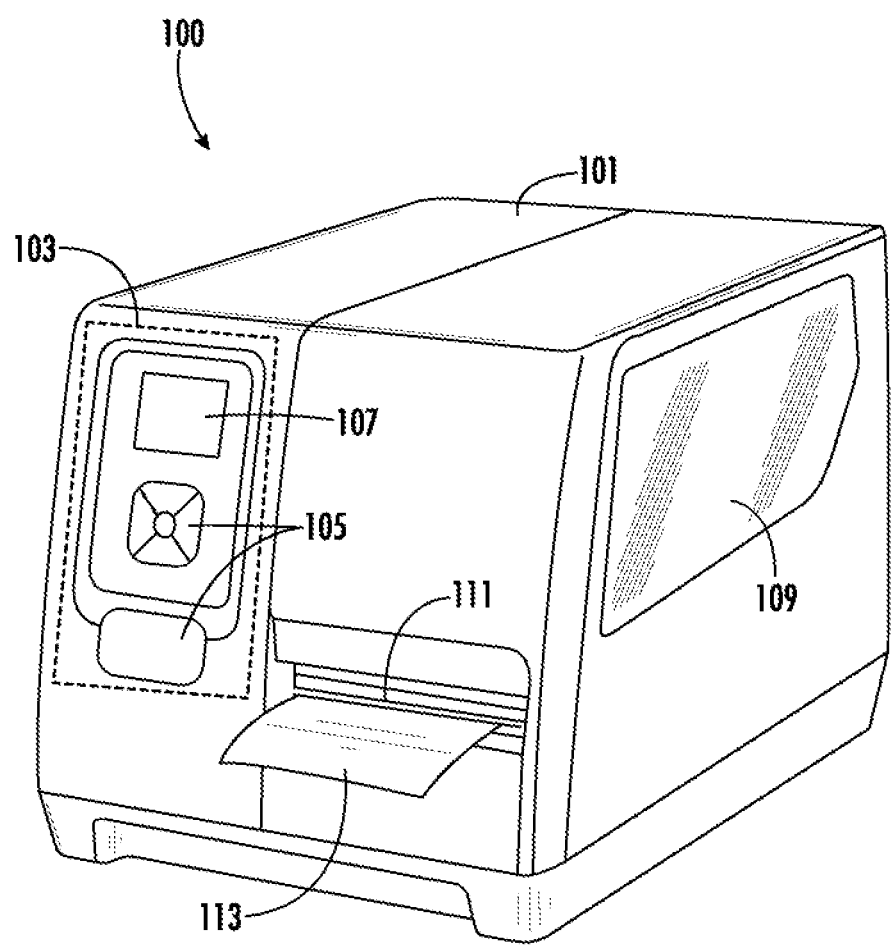
FIG. 1A illustrates an example printing apparatus in accordance with some embodiments of the present disclosure.

Some embodiments of the present disclosure will now be described more fully hereinafter with reference to the accompanying drawings, in which some, but not all embodiments of the disclosure are shown. Indeed, these disclosures may be embodied in many different forms and should not be construed as limited to the embodiments set forth herein; rather, these embodiments are provided so that this disclosure will satisfy applicable legal requirements. Like numbers refer to like elements throughout.

Unless the context requires otherwise, throughout the specification and claims which follow, the word "comprise" and variations thereof, such as, "comprises" and "comprising" are to be construed in an open sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, one or more particular features, structures, or characteristics from one or more embodiments may be combined in any suitable manner in one or more other embodiments.

The word "example" or "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly,"

"typically," "optionally," "for example," "often," or "might" (or other such language) be included or have a characteristic, that a specific component or feature is not required to be included or to have the characteristic. Such a component or feature may be optionally included in some embodiments, or it may be excluded.

In the present disclosure, the terms "electronically coupled," "electronically coupling," "electronically couple," "in communication with," "in electronic communication with," or "connected" in the present disclosure refers to two or more components being connected (directly or indirectly) through wired means (for example but not limited to, system bus, wired Ethernet) and/or wireless means (for example but not limited to, Wi-Fi, Bluetooth, ZigBee), such that data and/or information may be transmitted to and/or received from these components.

In the present disclosure, the terms "printer" and "printing apparatus" refer to a device that may imprint texts, images, shapes, symbols, graphics, and/or the like onto print media to create a persistent, human-viewable representation of the corresponding texts, images, shapes, symbols, graphics, and/or the like. Example printing apparatuses may include, for example, thermal direct printers, laser toner printers, ink drop printers, etc. For example, an example printing apparatus in accordance with various embodiments of the present disclosure may print machine-readable indicium (such as, but not limited to, barcodes, OCR-characters, QR codes, text, illustrations, etc.) onto print media (e.g., labels, tickets, plain paper, synthetic paper, receipt paper, plastic transparencies, and the like). Example components of an example printing apparatus are illustrated and described in connection with FIG. 1A, FIG. 1B. and FIG. 1C. Unless otherwise indicated, the terms "printer" and "printing apparatus" encompass printers with or without an integrated indicium verifier.

In the present disclosure, the terms "print media," "physical print media," "paper," and "labels" refer to tangible, substantially durable physical material onto which text, graphics, images and/or the like may be imprinted and persistently retained over time. Physical print media may be used for personal communications, business communications, and/or the like to convey prose expression (including news, editorials, product data, academic writings, memos, and many other kinds of communications), data, advertising, fiction, entertainment content, and illustrations and pictures. Physical print media may be generally derivatives of wood pulp or polymers, and includes office paper, clear or tinted acetate media, newsprint, envelopes, mailing labels, product labels, and other kinds of labels. Thicker materials, such as cardstock or cardboard, may be included as well. More generally, print media may be used to receive ink, dye, or toner, or may be a media whose color or shading can be selectively varied (for example, through selective application of heat, light, or chemicals) to create a persistent visual contrast (in black and white, shades of gray, and/or colors) that can be perceived by the human eye as texts, images, shapes, symbols, or graphics. In exemplary embodiments discussed throughout this disclosure, reference may be made specifically to "paper" or "labels;" however, the operations, system elements, and methods of such exemplary applications may be applicable to media other than or in addition to the specifically mentioned "paper" or "labels." In some embodiments, the print media may be continuous or non-continuous.

In the present disclosure, the terms "indicium," "indicia," "machine-readable indicium," "machine-readable indicia," "barcode" and "OCR-B character" refer to an optical representation of data (e.g., data is encoded into the barcode and OCR-B character) that may be scanned (i.e., machine read) by a scanning apparatus (e.g. a barcode scanner, a machine-reader, etc.). There are many types of barcodes and OCR-B characters for many applications. Barcodes may be one-dimensional barcodes (e.g., Universal Product Code, U.P.C.) having dark lines (i.e., bars) and light lines (i.e., spaces) of various widths arranged along a scan axis. Barcodes may be two-dimensional matrix symbols (e.g., Aztec Code, Data Matrix, QR Code, PDF417, etc.) (herein a "two-dimensional barcode") having a two-dimensional array of light features, dark features, and (in some cases) alignment features. The light and dark features may include "modules," i.e., the printed (or unprinted) squares in a two-dimensional matrix symbol. The graphical look of a two-dimensional barcode is created by different patterns of geometric shapes. Some barcodes may use color (e.g., Ultracode) to encode data. OCR-B characters also encode data and include "modules" (i.e., printed or unprinted squares).

Indicia such as barcodes and OCR-B characters are printed on the print media. Once printed on a print media, an indicium is referred to herein as a "printed indicium." For example, once printed on a print media, the barcode is referred to herein as a "printed barcode." Similarly, the OCR-B character is referred to herein as a "printed OCR-B character" once printed on a print media. The print media on which the machine-readable indicium is printed may also be referred to herein as a "printed medium" or "printed media." The printed medium may be affixed to an object or an item. For example, the encoded data of the printed barcode may relate to the item(s) on which the printed medium is affixed. The terms "barcode" and "symbol" may be used interchangeably herein. The tolerance of the machine-readable indicium is closely related to the scanning apparatus' ability to read the printed indicium (e.g., a printed barcode) in a single scan, and to correctly interpret the encoded data.

Figure 1B:
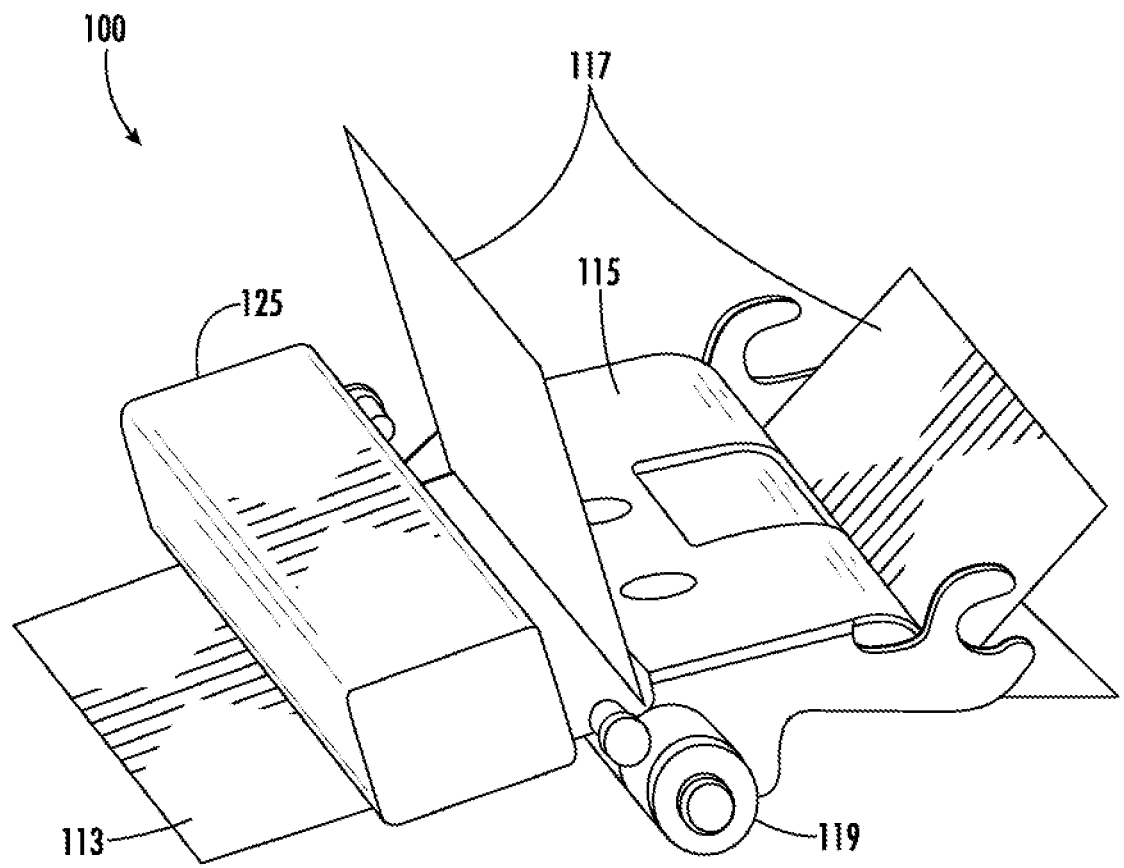
FIG. 1B illustrates example components of an example printing apparatus in accordance with some embodiments of the present disclosure.
Figure 1C:
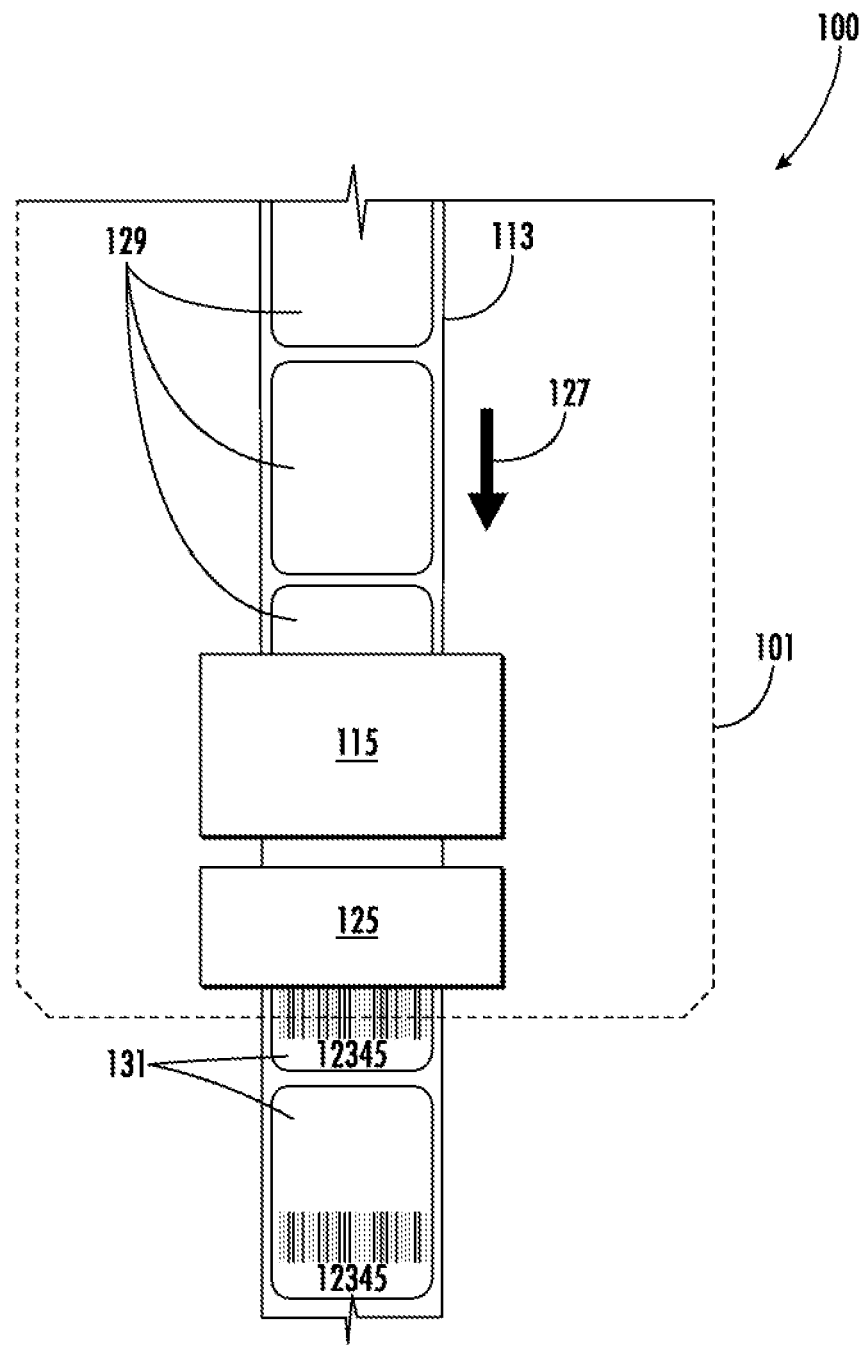
FIG. 1C illustrates an example block diagram of example components of an example printing apparatus in accordance with some embodiments of the present disclosure.

FIG. 1A, FIG. 1B, and FIG. 1C illustrate example views associated with example components of an example printing apparatus 100 in accordance with some embodiments of the present disclosure.

FIG. 1A is a perspective view illustrating an embodiment of the example printing apparatus 100. In some embodiments, the example printing apparatus 100 includes a housing 101, a user interface component 103 (including one or more user input components 105 and one or more user output components 107), a viewing window 109, and a print media output opening 111.

In some embodiments, the example printing apparatus 100 comprises a printing mechanism that is configured to carry out printing operations on print media 113. In some embodiments, after print operation is completed, print media 113 exits from the print media output opening 111 of the example printing apparatus 100 as shown in FIG. 1A. In some embodiments, the print media output opening 111 corresponds to a slot in the housing 101 of the printing apparatus 100 through which the printed media (for example, printed label) exits.

In some embodiments, the example printing apparatus 100 comprises an indicium verifier positioned inside the housing 101. In some embodiments, an indicium verifier may be positioned at or around the print media output opening 111. In some embodiments, an indicium verifier may be independent of the example printing apparatus 100 and configured to conduct verification tests after the print media 113 have exited the example printing apparatus 100.

In some embodiments, the indicium verifier associated with the example printing apparatus 100 may be configured to analyze the print quality of images printed onto the print media (such as labels). In some embodiments, the indicium verifier may further compare the analyzed print quality with certain quality standards, such as ISO/IEC 15415, ISO/IEC 15416, ISO/IEC 15426-1, ISO/IEC 15426-2, ANSI X3.182, among others. In some embodiments, if the print quality does not meet the standards or contains parameters that fall below a minimum acceptable threshold, then the indicium verifier can print diagnostic information onto the print media. For example, the diagnostic information may include quiet zone requirements, gray levels, ANSI grade levels, numeric ANSI grades, and/or bar width growth percentages.

FIG. 1B illustrates example interior components of the example printing apparatus 100. In some embodiments, these interior components may be incorporated entirely within the housing 101 of the example printing apparatus 100 of FIG. 1A.

In some embodiments, the example printing apparatus 100 comprises a media roll that provides print media 113. In an example embodiment, the media roll may correspond to a roll of a print media 113 that may be a continuous media or may, in some example embodiments, include a plurality of labels that are defined (in or on the print media 113) by means of one or more perforations or one or more marks. In an example embodiment, the plurality of labels in or on the print media 113 may correspond to portions on which the printing apparatus 100 may be configured to print content. In some examples, the one or more perforations and/or the one or more marks may define an edge between two adjacent labels.

In an example embodiment, the media roll is received by a media hub, which in turn is coupled to a first electrical drive (for example, a motor) that actuates the media hub. On actuation, the media hub causes the media roll to rotate, which further causes the media roll to supply the print media 113 to the printing mechanism 115.

In some embodiments, the printing mechanism 115 utilizes an ink ribbon 117 and thermally transferring ink from the ink ribbon 117 to the print media 113 as the print media 113 passes through the printing mechanism 115.

In some embodiments, the example printing apparatus 100 comprises a ribbon roll that provides the ink ribbon 117. In an example embodiment, the ink ribbon 117 may correspond to an ink media that can dispose ink onto the print media 113 to print content on the print media 113.

In an example embodiment, the ribbon roll is received by a ribbon drive assembly, which may be coupled to a second electrical drive (for example, a motor) that may be configured to actuate the ribbon drive assembly. On actuation of the ribbon drive assembly, the ribbon drive assembly rotates, which causes the ribbon roll to rotate and supply the ink ribbon 117 along a ribbon path. Along the ribbon path, the ink ribbon 117 traverses from the ribbon roll to the printing mechanism 115.

In some embodiments, the printing mechanism 115 comprises a thermal print head. For example, the printing mechanism 115 may correspond to a component that is configured to print content on the print media 113. In an example embodiment, the printing mechanism 115 may include a plurality of heating elements that are energized and pressed against the ink ribbon 117 to perform a print operation. In operation, the printing mechanism 115 applies heat on the section of the ink ribbon 117 and, concurrently, presses the ink ribbon 117 against the print media 113 to transfer the ink on the print media 113. To press the ink ribbon 117 against the print media 113, the printing mechanism 115 travels in a vertically downward direction (or downward direction) to push the ink ribbon 117 against the print media 113. In embodiments where the print media 113 comprises thermal paper, the printing mechanism 115 may be directly pressed against the thermal paper to perform the print operation.

In some embodiments, one or more heating elements of the plurality of heating elements are energized to perform the print operation. The one or more heating elements may be selected based on the data in a print job. For example, if a barcode is to be printed, the one or more heating elements (that are energized) are positioned on the printing mechanism 115 in such a manner that, when the printing mechanism 115 is pressed against the ink ribbon 117 and the print media 113, the barcode gets printed on the print media 113.

In some embodiments, the example printing apparatus 100 comprises a platen roller 119 configured for moving the print media 113 through the example printing apparatus 100. In some embodiments, the platen roller 119 provides a surface for supporting the print media 113 when the printing mechanism 115 applies ink from the ink ribbon 117 to the print media 113.

In an example embodiment, after the print operation, the print media 113 and the ink ribbon 117 traverse along a media path and a ribbon path, respectively. In some embodiments, the print media 113 traverses along the media path below the indicium verifier 125 after the print operation. In some embodiments, the indicium verifier 125 may include an image capturing device that is configured to capture an image of the printed content (for example, the printed indicium on the print media 113). Based on the image of the printed content, the printing apparatus 100 may verify the printed content (i.e. determine whether the printed content is acceptable). In some examples, the verification of the printed content may enable the printing apparatus 100 to perform various operations such as, but not limited to, correcting the printed content and/or detecting an error in printed content.

In some embodiments, the indicium verifier 125 may determine information regarding the ANSI grades (for example, by evaluating the gray-level image to a standard such as ISO/IEC 15415 and 15416). In some embodiments, information regarding the ANSI grades may be stored in a digital file for later retrieval or displayed temporarily on a computer screen. In the example shown in FIG. 1B (where the indicium verifier 125 is located in proximity to the printing mechanism 115), the indicium verifier 125 may instruct the printing mechanism 115 to immediately print the diagnostic information onto the same label that is being printed. In some embodiments, the indicium verifier 125 may instruct the platen roller 119 to retract the print media 113 to print the diagnostic information.

In the present invention, detailed print quality information and/or diagnostic information can be printed directly on a failed label. Examples of useful information that can be printed on the label may include an ANSI grading level (e.g., "A"-"F"), a numeric ANSI grade level (e.g., from 0.0 to 4.0), a pass/fail grade, and/or the like.

As such, according to some embodiments, a printer (e.g., the example printing apparatus 100) may comprise the printing mechanism 115 configured to print images onto print media 113. The printer (e.g., the example printing apparatus 100) may further comprise the indicium verifier 125 configured to monitor the print quality of images printed onto the print media. The indicium verifier 125 may be configured to analyze the print quality to determine if the print quality meets predetermined quality standards. In some embodiments, when the indicium verifier 125 determines that the print quality does not meet the predetermined quality standards, the indicium verifier 125 may instruct the printing mechanism 115 to print diagnostic information onto the print media.

FIG. 1C is a block diagram showing an embodiment of example components of the example printing apparatus 100.

The example printing apparatus 100 shown in FIG. 1C comprises the printing mechanism 115 and the indicium verifier 125. It should be noted that these elements may be disposed completely or partially inside the housing 101 of the example printing apparatus 100.

In operation, print media 113 is fed through the example printing apparatus 100 in the direction of arrow 127, as shown in FIG. 1C. The print media 113 may include blank labels 129 onto which the printing mechanism 115 prints images on to produce printed indicium 131 that are fed through a print media output opening of the example printing apparatus 100.

In some embodiments, the indicium verifier 125 may be incorporated into the structure of the housing 101 itself or positioned at or near a print media output opening of the example printing apparatus 100. In some embodiments, the indicium verifier 125 may be a contact image sensor (CIS) device, a one dimensional image scanner, a two dimensional image sensor, a scanner, or other device for capturing the images printed on the print media 113 (for example, printed indicium 131 that is printed on the print media 113).

As described above, the example printing apparatus 100 can be configured such that the printing mechanism 115 and the indicium verifier 125 (comprising a CIS device) are positioned adjacent to or near each other. In this way, the sensing or scanning of the print quality can take place immediately after the printing mechanism 115 prints images onto the print media 113. In some embodiments, after the verification of the printed indicium 131, the printed media 113 (along with the printed indicium 131) exits though the print media output opening of the housing 101 of the example printing apparatus 100.

While the printing apparatus 100 shown in FIG. 1A to FIG. 1C illustrates an example thermal transfer printing apparatus, it is to be understood that various embodiments of the present invention may be used in other types of printing apparatus (such as, but not limited to, ink-drop printing apparatus, laser-toner printing apparatus, etc.).

Figure 2:
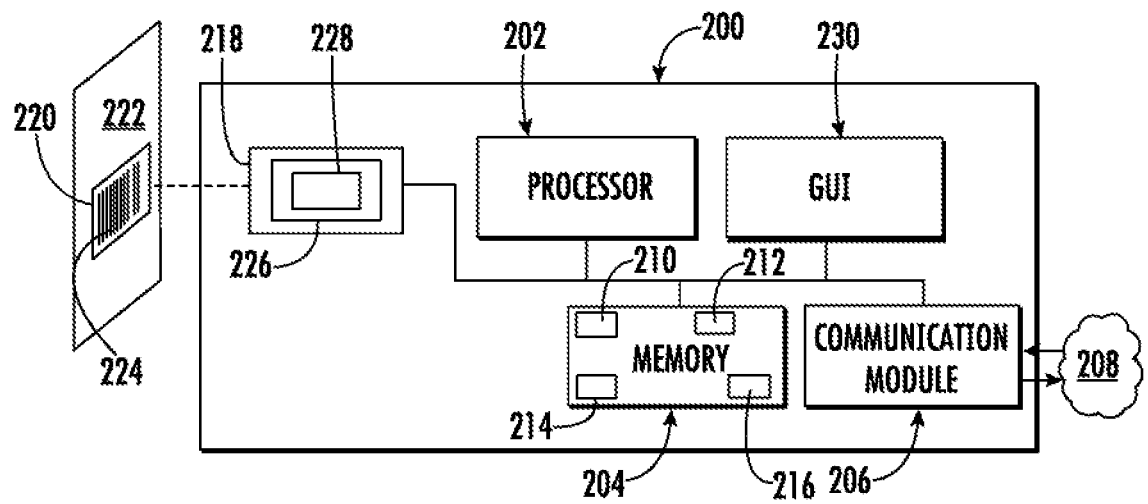
FIG. 2 illustrates an example block diagram of an example printing apparatus in accordance with some embodiments of the present disclosure.

Referring now to FIG. 2, an example block diagram of the printing apparatus 200 is illustrated. In some embodiments, the printing apparatus 200 may comprise a processor 202, a memory 204 communicatively coupled to the processor 202, and a power source. The printing apparatus 200 may further comprise a communications module 206 communicatively coupled to one or more of the other printing apparatus components.

In some embodiments, a central processing unit (CPU) (i.e., the processor 202) is the electronic circuitry that carries out the instructions of a computer program by performing the basic arithmetic, logical, control and input/output (I/O) operations specified by the instructions as described herein. In some embodiments, the printing apparatus 200 may be communicatively connected using the communications module 206 to a computer or a network 208 via a wired or wireless data link. In a wireless configuration, the communications module 206 may communicate with a host device over the network 208 via a variety of communication protocols (e.g., WI-FI®, BLUETOOTH®), CDMA, TDMA, or GSM). In accordance with various embodiments of the present invention, the memory 204 is configured to store, for example but not limited to, a print quality verification program 210, a reference image 212, a quiet zone requirement data 214, and a printer firmware 216.

In the example shown in FIG. 2, an indicium verifier 218 is disposed in the printing apparatus 200 and is configured to capture a representation of the printed image (e.g., printed barcode 220 on print medium 222 within a field of view 224), using an image sensor 226 (i.e., the indicium verifier 218 comprises the image sensor 226) to obtain a captured image. In some embodiments, the image sensor 226 comprises a light source 228 for illuminating the field of view. In some embodiments, the image sensor 226 uses an imaging lens (or lenses) to form a real image of the field of view 224 on an array of photo sensors (e.g., a linear or two-dimensional (2D) array charge-coupled device (CCD), complementary metal-oxide-semiconductor (CMOS) sensor, etc.). Electronic signals from the photo sensors are used to create gray level or color images, which would result in a digital image similar to that which may be obtained by a digital camera. In some embodiments, the processor 202 is further configured to carry out steps of methods as described above in accordance with various embodiments of the present invention.

In some embodiments, the GUI 230 may be operationally/communicatively coupled to the processor 202 for controlling the operation of the printing apparatus 200, in addition to other functions. For example, one or more setting options may be rendered for display on the GUI 230, details of which are described herein.

Figure 3:
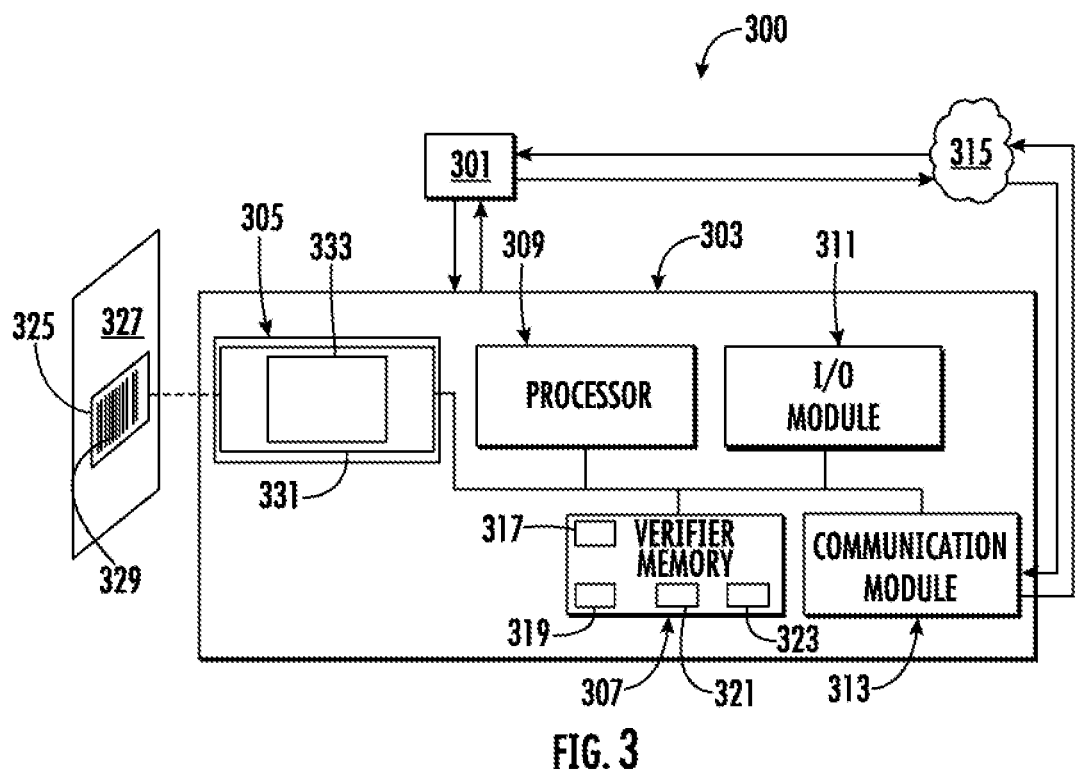
FIG. 3 illustrates an example block diagram of an example printing apparatus and an example indicium verifier in accordance with some embodiments of the present disclosure.

Referring now to FIG. 3, a printing apparatus 301 (e.g. a printing mechanism) communicatively coupled to the indicium verifier 303 in the system 300 for printing an image and verifying a print quality of the image is shown. The printing apparatus 301 may be similar to the printing apparatus 100 depicted in FIG. 1A to FIG. 1C, except that the indicium verifier 303 is separated from the printing apparatus 301 in the system 300.

Similar to the printing apparatus 100 described above in connection with FIG. 1A to FIG. 1C, the printing apparatus 301 may comprise a processor, a memory communicatively coupled to the processor, and a power source. The printing apparatus may further comprise a communications module communicatively coupled to one or more of the other printing apparatus components. The printing apparatus 301 may have a fewer or greater number of components as described above.

In some embodiments, the indicium verifier 303 comprises an imaging module 305, a memory (e.g. a verifier memory 307) communicatively coupled to the imaging module 305 and a central processing unit (CPU) (herein a "verifier processor" 309) communicatively coupled to the verifier memory 307 and the imaging module 305. In some embodiments, the indicium verifier 303 may further comprise an I/O module 311 and a verifier communication module 313.

In some embodiments, the subsystems in the indicium verifier 303 of FIG. 3 are electrically connected via a coupler (e.g., wires, traces, etc.) to form an interconnection subsystem. The interconnection system may include power buses or lines, data buses, instruction buses, address buses, etc. that allow operation of the modules/subsystems and the interaction there between. The I/O module 311 may include a verifier graphical user interface. In various embodiments, the indicium verifier 303 may be communicatively connected using the verifier communication module 313 to the computer or the network 315 via a wired or wireless data link. In a wireless configuration for the wireless data link, the verifier communication module 313 may communicate with a host device, such as the computer, or the network 315, via a variety of communication protocols (e.g., WI-FI®, BLUETOOTH®, NFC®, RFID®), CDMA, TDMA, or GSM). The verifier memory 307 may store a print quality verification program 317, the reference image 319, the quiet zone requirement data 321, and the verifier firmware 323.

While FIG. 3 depicts a verifier memory 307 and a verifier processor 309 in the indicium verifier 303, it is to be understood that only the printing apparatus 301 or only the indicium verifier 303, or both the printing apparatus 301 and indicium verifier 303 communicatively coupled thereto may comprise the memory and the processor for executing the steps as described above (i.e., at least one of the verifier and the printing apparatus comprises a memory communicatively coupled to the imaging module and a processor communicatively coupled to the imaging module and memory). The indicium verifier 303 that is attached to the printing apparatus may rely on the memory and the processor of printing apparatus for executing the steps as described herein, and/or the indicium verifier 303 is a standalone device that has its own verifier memory 307 and verifier processor 309 for executing the steps as described herein. Additionally, or alternatively, the printing apparatus may rely on the verifier memory 307 and the verifier processor 309 of indicium verifier 303 attached to the printing apparatus for executing the steps as described herein.

The imaging module 305 disposed in indicium verifier 303 is configured to capture the representation of the printed image (e.g., the printed barcode 325 on the print media 327 in FIG. 3) within a field of view 329, using the image sensor 331 (i.e., the imaging module 305 comprises the image sensor 331). The image sensor 331 comprises the light source 333 for illuminating the field of view. The image sensor 331 uses an imaging lens (or lenses) to form a real image of the field of view 329 on an array of photo sensors (e.g., a linear or two-dimensional (2D) array charge-coupled device (CCD), complementary metal-oxide-semiconductor (CMOS) sensor, contact image sensor (CIS) device, etc.). Electronic signals from the photo sensors are used to create gray level or color images, e.g., which would result in a digital image that may be obtained by a digital camera.

Figure 4:
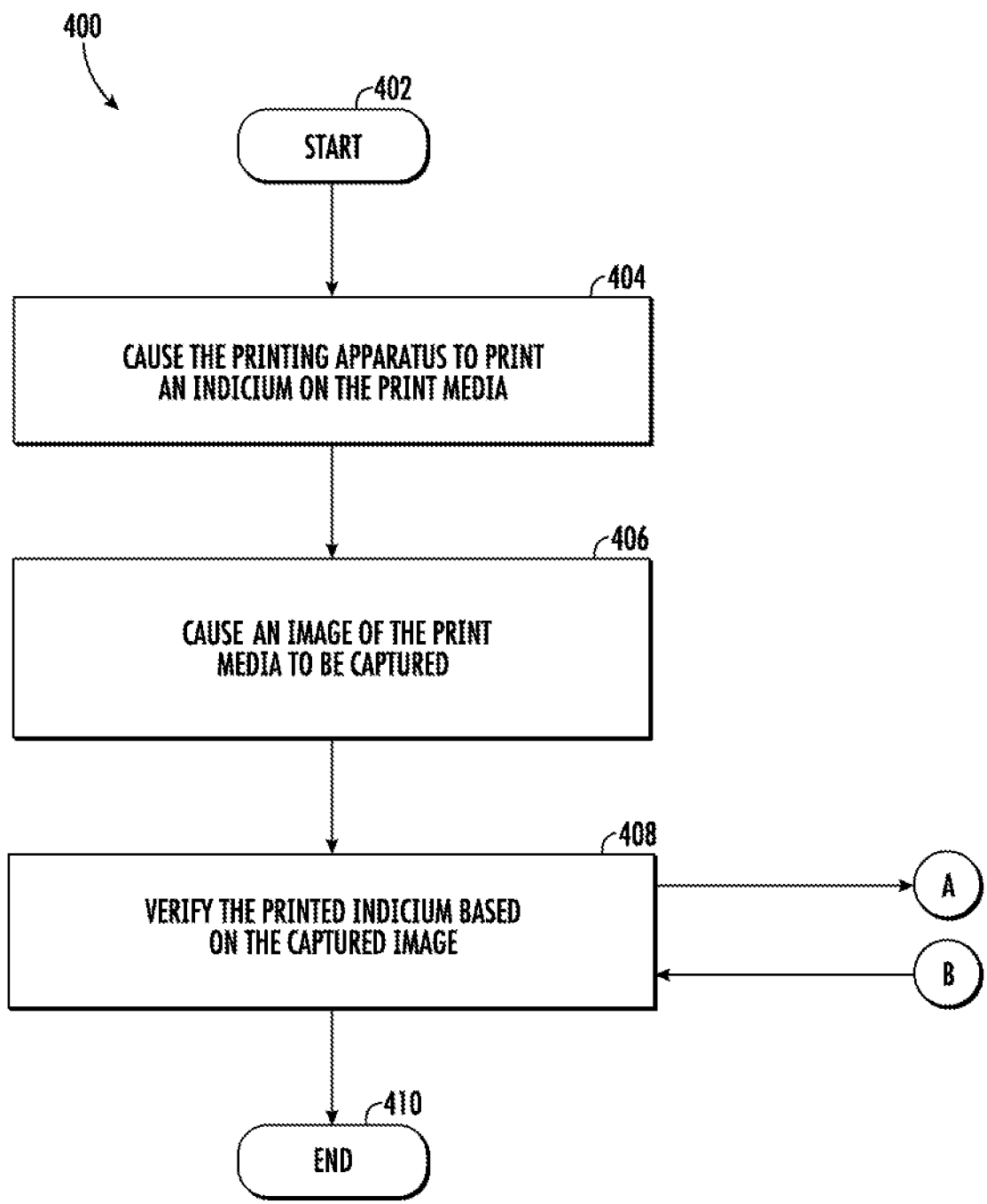
FIG. 4 is an example flow diagram illustrating an example method of operating an example printing apparatus in accordance with some embodiments of the present disclosure.

Referring now to FIG. 4, an example flow diagram illustrating an example method 400 of operating an example printing apparatus (such as, but not limited to, the example printing apparatus 100 described above in connection with FIG. 1A to FIG. 1C, the example printing apparatus 200 described above in connection with FIG. 2, and/or the example printing apparatus 301 described above in connection with FIG. 3) is illustrated.

The example method 400 starts at step/operation 402. Subsequent to and/or in response to step/operation 402, the example method 400 proceeds to step/operation 404. At step/operation 404, a processor (such as, but not limited to, the processor 202 of the printing apparatus 200 described above in connection with FIG. 2 and/or the verifier processor 309 of the system 300 described above in connection with FIG. 3) causes the printing apparatus to print an indicium on the print media.

In some embodiments, the processor may receive a user input requesting the indicium to be printed on the print media. For example, as described above in connection with at least FIG. 1A to FIG. 1C, an example printing apparatus in accordance with some embodiments of the present disclosure may comprise a GUI for communication between a user and the printing apparatus. In some embodiments, the GUI may comprise a display for displaying user interfaces. In some embodiments, the user interface may comprise one or more menu options, and the users may provide one or more user inputs by choosing the one or more menu options. As an example, the user interface may display a menu option of "Print Barcode." When the user selects this menu option, the processor receives a user input requesting the indicium to be printed on the print media.

In some embodiments, in response to receiving the user input, the processor may cause the printing apparatus to print an indicium on the print media. For example, the processor may generate or retrieve data of a print job associated with the indicium to be printed on the print media. Based on the print job, the processor may cause one or more heating elements on the print head of the printing apparatus to be selected in such a manner that, when the print head is pressed against the ribbon and the print media, the indicium gets printed on the print media. Similar to those described above, after the print operation, the print media and the ribbon traverse along the media path and the ribbon path, respectively.

Referring back to FIG. 4, subsequent to and/or in response to step/operation 404, the example method 400 proceeds to step/operation 406. At step/operation 406, a processor (such as, but not limited to, the processor 202 of the printing apparatus 200 described above in connection with FIG. 2 and/or the verifier processor 309 of the system 300 described above in connection with FIG. 3) causes an image of the print media to be captured.

In some embodiments, the captured image comprises the printed indicium from step/operation 404. For example, as described above in connection with FIG. 2, the example printing apparatus 200 may comprise an indicium verifier 218. In some embodiments, the indicium verifier 218 may comprise an image sensor 226. In some embodiments, the image sensor 226 may be positioned within the example printing apparatus 200, above the print media and subsequent to the print head along the print path, such that the processor causes the image sensor 226 to capture an image of the print media after content (e.g. indicium) is printed on the print media.

Referring back to FIG. 4, subsequent to and/or in response to step/operation 406, the example method 400 proceeds to step/operation 408. At step/operation 408, a processor (such as, but not limited to, the processor 202 of the printing apparatus 200 described above in connection with FIG. 2 and/or the verifier processor 309 of the system 300 described above in connection with FIG. 3) verifies the printed indicium based on the captured image.

As described above, an example printing apparatus in accordance with some embodiments of the present disclosure may comprise an indicium verifier that grades a printed indicium (such as, but not limited to, barcodes) immediately after it is printed and returns the verification results (including the grade of the printed indicium) to the user of the printing apparatus. In some embodiments, verifying the printed indicium based on the captured image comprises evaluating the print quality of printed indicium.

For example, if the printed indicium comprises a printed barcode, the indicium verifier and/or the printing apparatus analyze one or more barcode quality parameters of the printed barcode from the captured image that is generated at step/operation 406 (more particularly, a quality level achieved for each assessed parameter), and comparing the results against a barcode print quality standard such as a barcode print quality standard set forth in the ISO/IEC 15415, 29158, and/or 15416 barcode print quality test specifications, among many other barcode print quality standards.

In some embodiments, the parameters of barcode quality affecting the quality of the printed barcode are based on optics of scanning apparatuses (for example, barcode scanning systems). For example, barcode print quality parameters may include, among other parameters, a modulation parameter, a defects parameter, and a quiet zone area parameter. Each quality parameter may indicate a passing/failing status and/or a grade.

In addition to evaluating barcode print quality for meeting a print quality standard based on, for example, ANSI/CEN/ISO guidelines, the evaluation of barcode quality includes matching a printing application requirement such as a customer specification. Depending on the printing application requirement, higher or lower modulation grades, defects grades, and/or quiet zone grades may be required by the customer specification.

Referring back to FIG. 4, subsequent to and/or in response to step/operation 408, the example method 400 proceeds to step/operation 410 and ends.

As described above in connection with step/operation 408 of FIG. 4, an example method 400 of operating an example printing apparatus (such as, but not limited to, the example printing apparatus 100 described above in connection with FIG. 1A to FIG. 1C, the example printing apparatus 200 described above in connection with FIG. 2, and/or the example printing apparatus 301 described above in connection with FIG. 3) comprises verifying the printed indicium based on the captured image. In some embodiments, barcode quiet zone is one of the grading criteria for the indicium verifier to verify the printed indicium. In some embodiments, only when an indicium (such as a barcode) fulfills the quiet zone requirement (along with other criteria), will the indicium verifier grade the printed indicium as passed.

In the present disclosure, the terms "quiet zone area" and "quiet zone" refer to a zone or an area (for example, but not limited to, on a print media) surrounding an indicium (such as, but not limited to, a barcode, a QR code) that does not comprise any texts, characters, marks or obstacles. For example, a quiet zone area of an indicium may correspond to a blank space adjacent to the indicium. In some examples, a quiet zone area is also referred to as a "no-print zone." In some embodiments, the quiet zone area around an indicium can separate the indicium from other texts, marks or obstacles, such that a scanning apparatus (such as, but not limited to, a barcode scanner, a QR code scanner, and/or the like) can identify the indicium from a captured image and successfully process the indicium.

In some embodiments, the terms "quiet zone requirement" or "quiet zone area requirement" refer to a requirement of one or more sizes (for example, widths) of one or more quiet zone areas on the print media surrounding the indicium. In some embodiments, the quiet zone requirement may be a part of a barcode print quality test specification. Additionally, or alternatively, the quiet zone requirement may be based on a customer specification.

In some embodiments, a quiet zone requirement is associated with an indicium type. For example, if the indicium is in the form of a barcode, an example quiet zone requirement may require each of the left quiet zone area (which is to the left side of the left indicium area edge of the printed indicium or the printed indicium area described herein) and the right quiet zone area (which is to the right side of the right indicium area edge of the printed indicium or the printed indicium area described herein) to be at least ten times the width of the narrowest bar in the barcode. As another example, if the indicium is in the form of a QR code, an example quiet zone requirement may require each of the top quiet zone area (which is above the top indicium area edge of the printed indicium or the printed indicium area described herein), the bottom quiet zone area (which is below the bottom indicium area edge of the printed indicium or the printed indicium area described herein), the left quiet zone area (which is to the left of the left indicium area edge of the printed indicium or the printed indicium area described herein), and the right quiet zone area (which is to the right of the right indicium area edge of the printed indicium or the printed indicium area described herein) to be at least four times the width of a single data square in the QR code.

In some embodiments, an example printing apparatus in accordance with some embodiments of the present disclosure may generate a quiet zone grade associated with a quiet zone area of a printed indicium based on determining whether the quiet zone area (e.g. from an image of the printed indicium) satisfies the applicable quiet zone requirements.

Figure 5A:
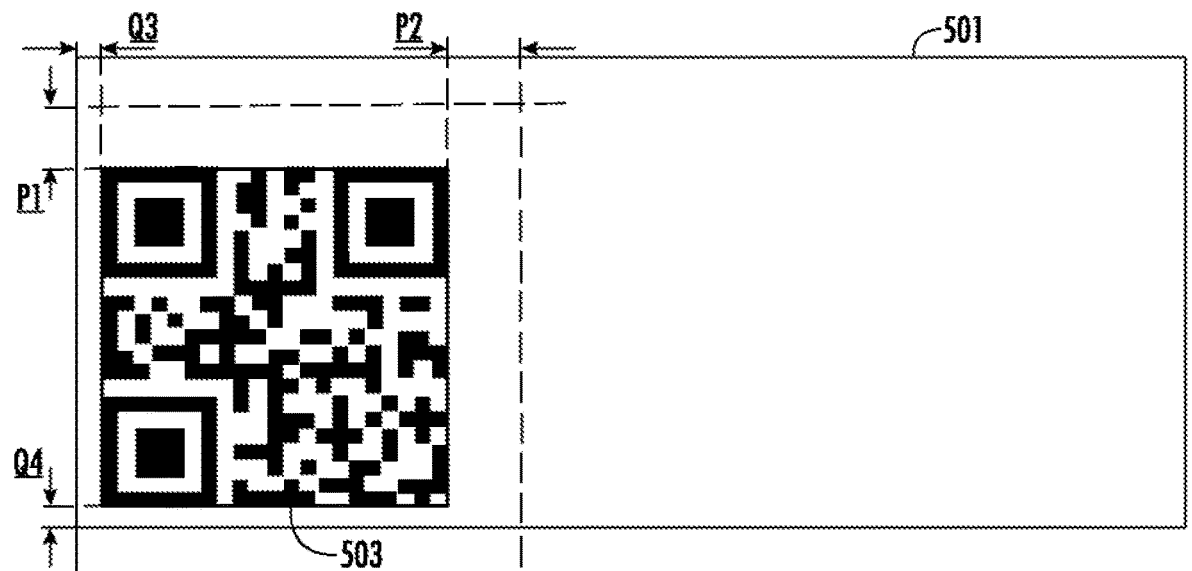
FIG. 5A illustrates an example print media with an example printed indicium in accordance with some embodiments of the present disclosure.

For example, as shown in FIG. 5A, an example print media 501 in accordance with some embodiments of the present disclosure is illustrated. In particular, the example print media 501 in the example shown in FIG. 5A is in the form of a label. In some embodiments, an example printed indicium 503 is printed on the example print media 501. In the example shown in FIG. 5A, the example printed indicium 503 is in the form of a QR code.

As described above, an example printing apparatus in accordance with some embodiments of the present disclosure may verify the printed indicium and evaluate the print quality of the indicium by at least generating a quiet zone grade of the printed indicium. In doing so, the example printing apparatus may determine whether the one or more quiet zone areas surrounding the printed indicium satisfy the corresponding quiet zone requirements.

In the example shown in FIG. 5A, the example printing apparatus may determine that the top quiet zone requirement P1 for the top quiet zone area (e.g. to the top of the top indicium area edge of the printed indicium/printed indicium area) has been satisfied. In other words, the example processor determines that there is enough blank space to the top of the indicium to separate the indicium from other texts, characters, marks or obstacles that are to the top of the indicium, if any.

Similarly, the example printing apparatus may determine that the right quiet zone requirement P2 for the right quiet zone area (e.g. to the right of the right indicium area edge of the printed indicium/printed indicium area) has been satisfied. In other words, the example processor determines that there is enough blank space to the right of the indicium to separate the indicium from other texts, characters, marks or obstacles that are to the right of the indicium, if any.

In some embodiments, the example printing apparatus may determine that the bottom quiet zone area Q4 does not satisfy the quiet zone requirement associated with the bottom quiet zone for the indicium. For example, the example printing apparatus identifies the bottom quiet zone area Q4 as the blank space between the bottom indicium area edge of the printed indicium 503 and a bottom print media edge of the print media 501. The example printing apparatus may determine that the bottom quiet zone area Q4 is narrower than a required width between the bottom indicium area edge of the printed indicium and the bottom print media edge of the print media as specified by the quiet zone requirement associated with the bottom quiet zone area, thus failing to satisfy the quiet zone requirement.

Similarly, the example printing apparatus may determine that the left quiet zone area Q3 does not satisfy the quiet zone requirement associated with the left quiet zone for the indicium. For example, the example printing apparatus identifies the left quiet zone area Q3 as the blank space between the left indicium area edge of the printed indicium 503 and a left print media edge of the print media 501. The example printing apparatus may determine that the left quiet zone area Q3 is narrower than a required width between the left indicium area edge of the printed indicium and the left print media edge of the print media as specified by the quiet zone requirement associated with the left quiet zone area, thus failing to satisfy the left quiet zone requirement.

As such, because the quiet zone requirement associated with the left quiet zone area and the quiet zone requirement associated with the bottom quiet zone area are not satisfied by the printed indicium 503 (e.g. the printed indicium 503 is positioned too close to the bottom print media edge of the print media 501 and too close to the left print media edge of the print media 501), the example printing apparatus may generate a quiet zone grade indicating that the printed indicium 503 has failed.

However, there are many technical challenges and difficulties associated with generating a quiet zone grade and evaluating the print quality of the printed indicium.

For example, a user may operate an example printing apparatus to print barcodes on small labels, where the positions of barcodes are near the edges of the labels. As illustrated above, such barcodes printed on the small labels will not satisfy the quiet zone requirement because at least one of the barcode edges will be too close to the label edges, and not have enough blank space. The example printing apparatus may grade such barcodes as failing.

However, when such "failing" labels are attached to and/or pasted on objects such as packages, there may be blank space on the surface of the object surrounding the location where the label is attached and/or pasted, and the surface color of these objects can be similar to the label color of the label. In such an example, the surface of these objects can provide additional blank space around the labels.

Figure 5B:
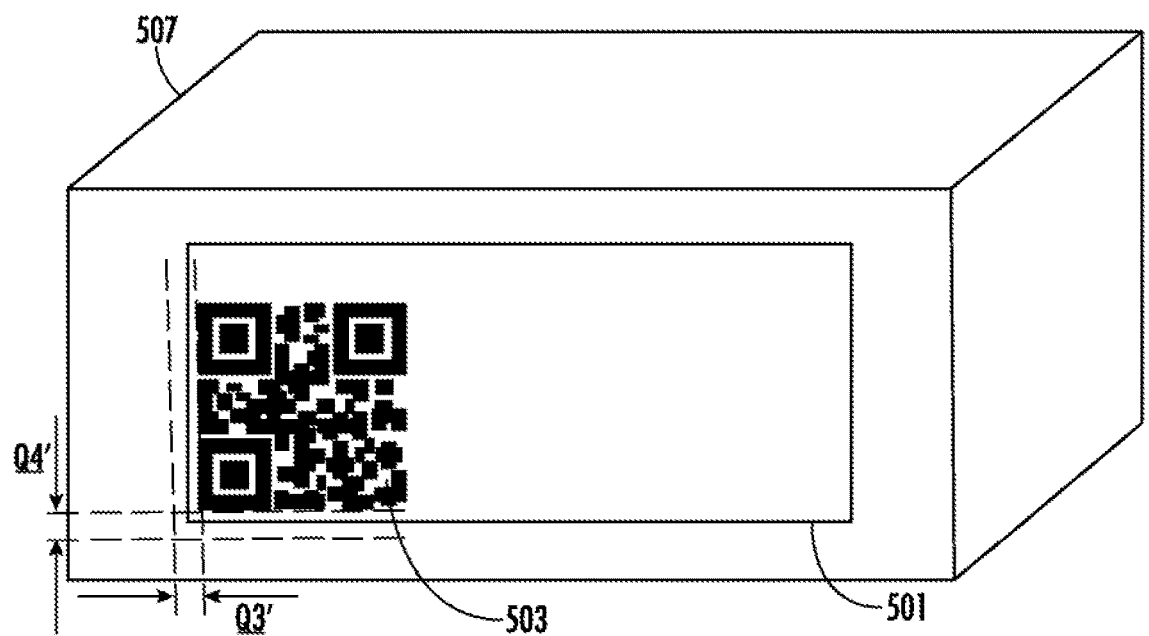
FIG. 5B illustrates an example object where an example print media is attached in accordance with some embodiments of the present disclosure.

Referring now to FIG. 5B, an example object 507 is illustrated. In particular, the print media 501 is attached to a surface of the example object 507. As shown in FIG. 5B, the surface of the example object 507 provides additional blank space to the bottom print media edge of the print media 501 and to the left print media edge of the print media 501. In such an example, the left quiet zone area Q3' includes not only the left blank space on the print media 501, but also the blank space on the surface of the object 507. Similarly, the bottom quiet zone area Q4' includes not only the bottom blank space on the print media 501, but also the blank space on the surface of the object 507.

If the user scans the printed indicium 503 with a scanning apparatus (such as a barcode scanner), the scanning apparatus may indicate that the printed indicium 503 is acceptable as a passing barcode because there is enough blank space on the print media 501 and on the surface of the object 507 to separate the printed indicium 503 from other texts, characters, marks or obstacles that surround the printed indicium 503, if any. As such, even though the printing apparatus grades the printed indicium 503 as failing, the printed indicium 503 would satisfy the quiet zone requirement when attached to and/or pasted on the object 507.

The above example in connection with FIG. 5A and FIG. 5B illustrates technical problems associated with printing. For example, many users, including those in the manufacturing industry, prefer to print and verify barcodes on very small labels (for example, the label being just big enough to include a barcode), and many printing apparatuses cannot be used for the purpose of grading such barcodes. In particular, an example indicium verifier would grade such barcodes as failing, but the users will have no issue scanning the barcodes with barcode scanners after the labels are pasted on packages. In other words, the scanners may recognize the barcodes as passing barcodes, but the indicium verifier of the printing apparatus may not. As such, users cannot rely on the grading from the indicium verifier of the printing apparatus to determine whether the printed barcodes are acceptable, which could make the verification function of the printing apparatus unusable to the users. Many users may also report issues on the discrepancy between grading results from the printing apparatuses and scanning results from the scanning apparatuses.

Various embodiments of the present disclosure overcome these technical challenges and difficulties, and provide various technical improvements and advantages. For example, various embodiments of the present disclosure may programmatically add extra blank spaces around the affected sides of an indicium (for example, a barcode) to simulate a situation where the printed media (for example, a label) is attached to and/or pasted on a package. Additionally, or alternatively, various embodiments of the present disclosure may reduce the quiet zone requirement for the affected side(s) of the printed indicium during grading.

For example, various embodiments of the present disclosure may introduce a new configuration on the example printing apparatus to enable or disable an "Overwrite Quiet Zone at Label Edge" function prior to or during printing a barcode on a label. The firmware of the printing apparatus may be executed by a processor of the printing apparatus to crop the barcodes out from the captured image of the printed label to perform verification. If the "Overwrite Quiet Zone at Label Edge function" is enabled, for each barcode, the processor determines whether any of its quiet zone areas are near the label edges when the firmware is executed. If so, the processor determines which sides of the barcode are affected (i.e. too close to the label edges) when executing the firmware. In some embodiments, during verification, a processor of the printing apparatus may reduce the quiet zone requirement for grading the affected side(s) and/or artificially add blank space to the affected side(s) to pass the quiet zone requirement. For the unaffected side(s), the processor grades them as per usual. Besides generating the quiet zone grade, other verifications may be carried out per usual by the processor. In some embodiments, the processor returns the results of verification to the user, with notes to indicate which sides have been graded with overwritten quiet zone area(s) or requirements.

As such, various embodiments of the present disclosure provide various technical benefits and advantages. For example, various embodiments of the present disclosure enable users to print and verify very small labels. Various embodiments of the present disclosure also enable users who print larger labels to position the barcodes near the label edges. As such, various embodiments of the present disclosure add more freedom for users in terms of where to position the barcodes on the labels, and users are less restricted by the quiet zone requirement when designing labels. Users can potentially fit in more contents into the labels and have more freedom to decide the label sizes to use. Further, various embodiments of the present disclosure may also resolve the technical issues such as discrepancies between the quiet zone grade of the printed indicium by the printing apparatus and the actual scanning result of the printed indicium by a scanning apparatus.

Various example methods described herein, including, for example, those as shown in FIG. 6 to FIG. 9, may provide various technical advantages and/or improvements described above.

It is noted that each block of the flowchart, and combinations of blocks in the flowchart, may be implemented by various means such as hardware, firmware, circuitry and/or other devices associated with execution of software including one or more computer program instructions. For example, one or more of the methods described in FIG. 6 to FIG. 9 may be embodied by computer program instructions, which may be stored by at least one non-transitory memory of an apparatus employing an embodiment of the present disclosure and executed by at least one processor in the apparatus. These computer program instructions may direct a computer or other programmable apparatus to function in a particular manner, such that the instructions stored in the computer-readable storage memory produce an article of manufacture, the execution of which implements the function specified in the flowchart block(s).

As described above and as will be appreciated based on this disclosure, embodiments of the present disclosure may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Similarly, embodiments may take the form of a computer program code stored on at least one non-transitory computer-readable storage medium. Any suitable computer-readable storage medium may be utilized including non-transitory hard disks, CD-ROMs, flash memory, optical storage devices, or magnetic storage devices.

Figure 6:
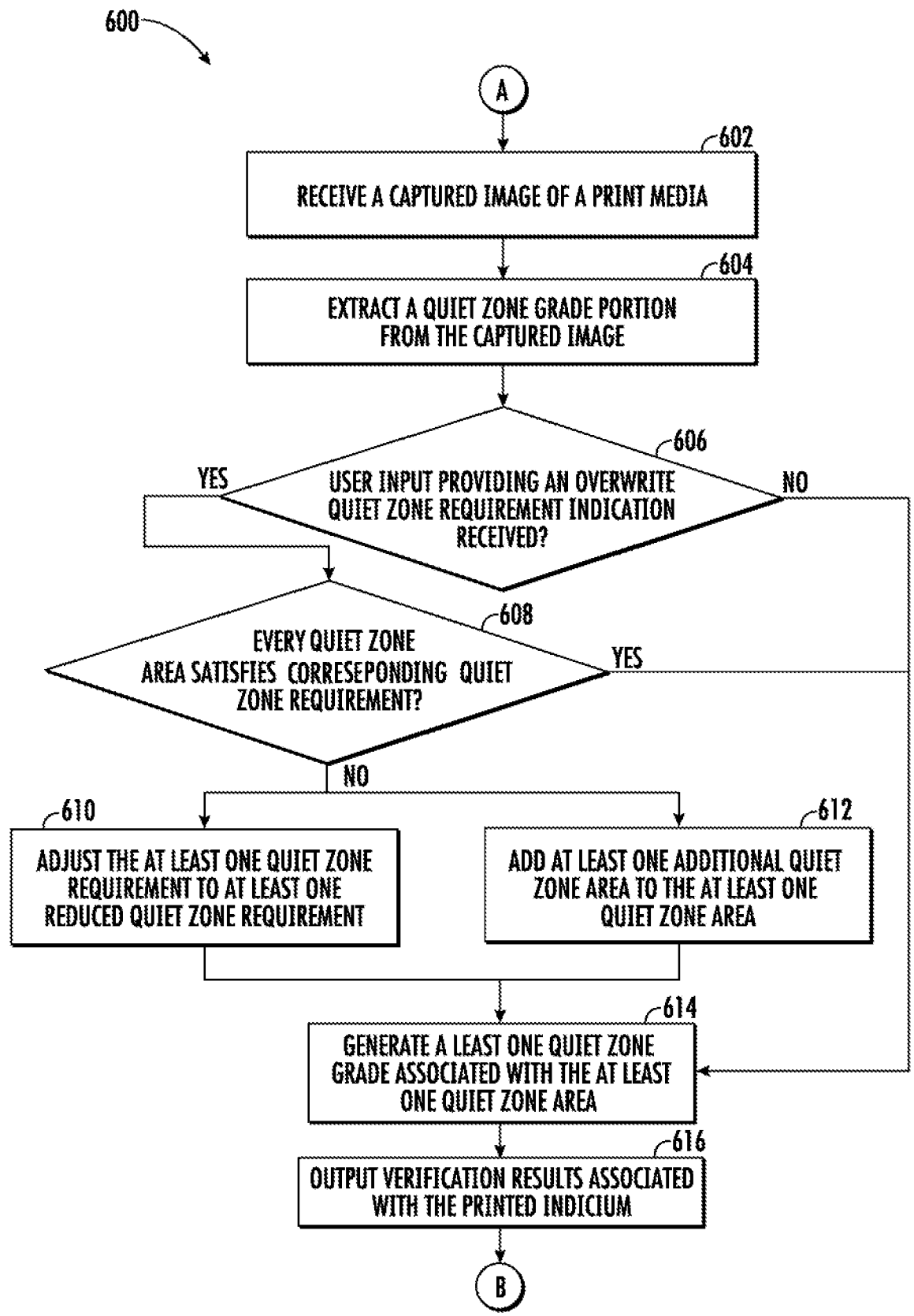
FIG. 6 is an example flow diagram illustrating an example method for verifying a printed indicium in accordance with some embodiments of the present disclosure.

Referring now to FIG. 6, an example flow diagram illustrating an example method 600 for verifying a printed indicium is provided.

The example method 600 starts at block A from FIG. 4. As illustrated in FIG. 4, block A is connected to step/operation 408, where the processor verifies the printed indicium. As such, the example method 600 may be part of the step of verifying the printed indicium (e.g. the processor carries out the example method 600 during verifying the printed indicium for verification purposes).

In some embodiments, subsequent to and/or in response to block A, the example method 600 proceeds to step/operation 602. At step/operation 602, a processor (such as, but not limited to, the processor 202 of the printing apparatus 200 described above in connection with FIG. 2 and/or the verifier processor 309 of the system 300 described above in connection with FIG. 3) receives a captured image of a print media.

In some embodiments, the processor may receive the captured image of the print media that comprises the printed indicium.

For example, as described above in connection with FIG. 2, the example printing apparatus 200 may comprise an indicium verifier 218. In some embodiments, the indicium verifier 218 may comprise an image sensor 226. In some embodiments, the image sensor 226 may be positioned within the example printing apparatus 200, above the print media and subsequent to the print head along the print path, such that the image sensor 226 captures an image of the print media after content (e.g. indicium) is printed on the print media. In some embodiments, the image sensor 226 may transmit image data of the image to the processor, such that the processor receives a captured image of the print media comprising the printed indicium.

Additionally, or alternatively, as described above in connection with FIG. 3, an example indicium verifier 303 that is separated from the printing apparatus 301 may be in communication with the printing apparatus 301. In some embodiments, the indicium verifier 303 comprises an image sensor 331. In some embodiments, the image sensor 331 may be positioned above the print media (inside or outside of the printing apparatus 301) and subsequent to the print head along the print path, such that the image sensor 331 captures an image of the print media after content (e.g. indicium) is printed on the print media. In some embodiments, the image sensor 331 may transmit image data of the image to the processor, such that the processor receives a captured image of the print media comprising the printed indicium.

Figure 10A:
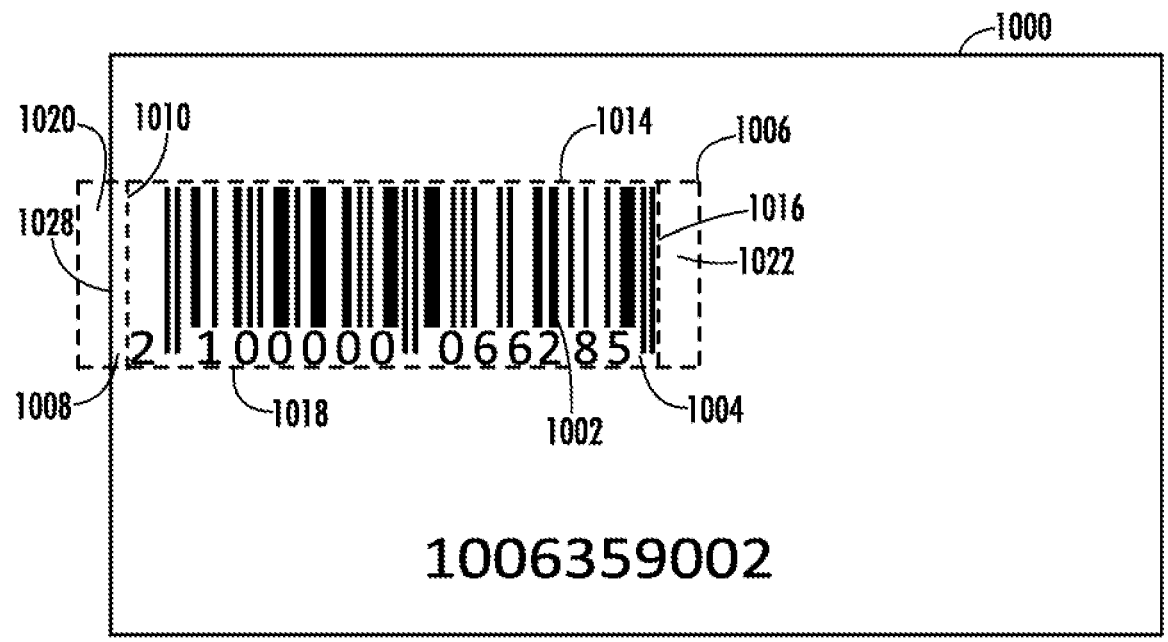
FIG. 10A illustrates an example captured image of an example print media in accordance with some embodiments of the present disclosure.

For example, referring now to FIG. 10A, an example captured image 1000 of a print media is illustrated. In the example shown in FIG. 10A, the example captured image 1000 comprises a printed indicium 1002 in the form of a barcode.

Referring back to FIG. 6, subsequent to and/or in response to step/operation 602, the example method 600 proceeds to step/operation 604. At step/operation 604, a processor (such as, but not limited to, the processor 202 of the printing apparatus 200 described above in connection with FIG. 2 and/or the verifier processor 309 of the system 300 described above in connection with FIG. 3) extracts a quiet zone grade portion from the captured image.

In some embodiments, the quiet zone grade portion extracted by the processor comprises a printed indicium area of the printed indicium and at least one quiet zone area that is adjacent to the printed indicium area.

For example, based on data in the print job of the example printing apparatus, the processor may determine the type and/or content of the indicium that is printed on the print media. In some embodiments, the processor may perform image processing analysis to identify the printed indicium from the captured image, and may crop out the image of the printed indicium 1002 from the captured image.

In some embodiments, when cropping out the image of the printed indicium, the processor may add buffer space surrounding the printed indicium on the captured image so that the printed indicium area is in a regular shape (e.g. a rectangular shape, a square shape, a circular shape, and/or the like). For example, as shown in FIG. 10A, the printed indicium 1002 (e.g. the barcode) printed on print media has an irregular outline. In some embodiments, the processor may add buffer space surrounding the irregular outline of the printed indicium 1002 so that the printed indicium area 1004 is in a rectangular shape. In some embodiments, the processor only adds the minimum buffer space surrounding the irregular outline of the printed indicium 1002 as necessary to provide a regular shape for the printed indicium area 1004.

In some embodiments, a quiet zone area is an area surrounding or at one side of a printed indicium (such as, but not limited to, a barcode, a QR code) that does not comprise any texts, characters, marks or obstacles. In some embodiments, the quiet zone grade portion extracted by the processor includes not only the printed indicium area, but also at least one quiet zone area that is adjacent to the printed indicium area.

For example, as shown in FIG. 10A, the quiet zone grade portion 1006 extracted by the processor comprises the printed indicium area 1004 and at least one quiet zone area adjacent to the printed indicium area 1004 (such as, but not limited to, a right quiet zone area 1022 and a left quiet zone area 1008). Additional examples associated with the quiet zone grade portions are described herein, including but not limited to, those described in connection with at least FIG. 7 to FIG. 9.

Referring back to FIG. 6, subsequent to and/or in response to step/operation 604, the example method 600 proceeds to step/operation 606. At step/operation 606, a processor (such as, but not limited to, the processor 202 of the printing apparatus 200 described above in connection with FIG. 2 and/or the verifier processor 309 of the system 300 described above in connection with FIG. 3) determines whether a user input providing an overwrite quiet zone requirement indication is received.

In the present disclosure, an overwrite quiet zone requirement indication indicates a user request to overwrite one or more quiet zone requirements for verifying one or more quiet zone areas of the printed indicia. For example, the overwrite quiet zone requirement indication may indicate a user request to overwrite one or more quiet zone requirements for verifying one particular printed indicium, and various embodiments of the present disclosure may carry out various example methods described herein for verifying that particular printed indicium. As another example, the overwrite quiet zone requirement indication may indicate a user request to overwrite one or more quiet zone requirements for verifying a plurality of printed indicia (for example, printed indicia associated with the same indicium type and/or the same user), and various embodiments of the present disclosure may carry out various example methods described herein to verify the plurality of printed indicia.

In some embodiments, a user may provide a user input with an overwrite quiet zone requirement indication to the printing apparatus. For example, as described above in connection with at least FIG. 1A to FIG. 1C, an example printing apparatus in accordance with some embodiments of the present disclosure may comprise a GUI for communication between a user and the printing apparatus. In some embodiments, the GUI may comprise a display for displaying user interfaces. In some embodiments, the user interface may be rendered for display based on a firmware of the printing apparatus.

In some embodiments, the user interface may comprise one or more menu options, and the users may provide one or more user inputs by choosing the one or more menu options. As an example, the user interface may display a menu option of "Overwrite Quiet Zone at Label Edge." When the user selects this menu option, the processor receives an overwrite quiet zone requirement indication as a user input.

While the description above provides an example of providing a user input with an overwrite quiet zone requirement indication, it is noted that the scope of the present disclosure is not limited to the description above.

Referring back to FIG. 6, if, at step/operation 606, the processor determines that that user input provides an overwrite quiet zone requirement indication, the example method 600 proceeds to step/operation 608. At step/operation 608, a processor (such as, but not limited to, the processor 202 of the printing apparatus 200 described above in connection with FIG. 2 and/or the verifier processor 309 of the system 300 described above in connection with FIG. 3) determines whether every quiet zone area satisfies corresponding quiet zone requirement. In other words, the processor determines whether the printed indicium satisfies the corresponding quiet zone requirements of the printed indicium.

In some embodiments, the processor may retrieve quiet zone requirement data associated with the quiet zone requirement from a memory or a data storage device (for example, the memory 204 of the example printing apparatus 200 described above in connection with FIG. 2 and/or the verifier memory 307 of the indicium verifier described above in connection with FIG. 3). In some embodiments, the processor may retrieve quiet zone requirement data based on an indicium type of the printed indicium.

In some embodiments, when determining whether the printed indicium satisfies a quiet zone requirement, the processor may determine whether a size of every quiet zone area equals or is larger than a required size of the corresponding quiet zone area as indicated by the at least one quiet zone requirement. For example, if the size of every quiet zone area equals or is larger than a required size of the corresponding quiet zone area, the processor determines that the printed indicium satisfies the quiet zone requirement. If the size of at least one quiet zone area is less than a required size of the at least one quiet zone area, the processor determines that the printed indicium does not satisfy the quiet zone requirement.

Additionally, or alternatively, when determining whether the printed indicium satisfies a quiet zone requirement, the processor may determine whether at least one print media edge of the print media is within, at or near the at least one quiet zone requirement area according to a quiet zone requirement and based on the quiet zone grade portion extracted at step/operation 604. When a print media edge is within, at or near the quiet zone requirement area in the quiet zone grade portion, the quiet zone grade portion comprises that print media edge (for example, the print media edge may provide an end to the quiet zone area on the print media). In some embodiments, if a print media edge of the print media is not within, at or near the quiet zone requirement area, the processor determines that the printed indicium satisfies the quiet zone requirement. If a print media edge of the print media is within, at or near the quiet zone requirement area, the processor determines that the printed indicium does not satisfy the quiet zone requirement.

In some embodiments, if the at least one print media edge of the print media is not at or near the at least one quiet zone requirement area, and/or if sizes of all quiet zone areas equal or are larger than the corresponding required sizes of these quiet zone areas, the processor determines that the printed indicium satisfies the quiet zone requirement.

In some embodiments, if the at least one print media edge of the print media is at or near the at least one quiet zone requirement area, or if a size of the at least one quiet zone area is less than a required size of the at least one quiet zone area, the processor determines that the printed indicium does not satisfy the quiet zone requirement.

As described above, different indicium area edges of an indicium may be associated with different quiet zone requirements. In some embodiments, in response to determining that the printed indicium does not satisfy the quiet zone requirement, the processor may determine which indicium area edge of the indicium/printed indicium area does not satisfy the quiet zone area requirement (e.g. which indicium area edge is too close to a print media edge of the print media). Additional examples of determining whether the printed indicium satisfies the quiet zone requirement are described herein, including, but not limited to, those described in connection with at least FIG. 7 to FIG. 9.

Referring back to FIG. 6, if, at step/operation 608, the processor determines that the printed indicium does not satisfy the quiet zone requirement (for example, at least one quiet zone area does not satisfy the quiet zone requirement), the example method 600 proceeds to step/operation 610 and/or step/operation 612.

For example, in response to receiving a user input providing an overwrite quiet zone requirement indication at step/operation 606 and determining that the at least one quiet zone area does not satisfy at least one quiet zone requirement at step/operation 608, the processor causes at least one of adjusting the at least one quiet zone requirement to at least one reduced quiet zone requirement or adding at least one additional quiet zone area to the at least one quiet zone area.

In some embodiments, at step/operation 610, a processor (such as, but not limited to, the processor 202 of the printing apparatus 200 described above in connection with FIG. 2 and/or the verifier processor 309 of the system 300 described above in connection with FIG. 3) adjusts at least one quiet zone requirement to at least one reduced quiet zone requirement.

As described above, the quiet zone requirement corresponds to a requirement of one or more sizes of one or more quiet zone areas surrounding the printed indicium on the print media. In some embodiments, when adjusting the quiet zone requirement to a reduced quiet zone requirement in response to determining that the user input providing the overwrite quiet zone requirement indication is received, the processor may determine a reduced quiet zone requirement where the one or more required sizes of one or more quiet zone areas are reduced.

For example, when determining that the at least one quiet zone area does not satisfy at least one quiet zone requirement at step/operation 608, the processor may determine that a size of a quiet zone area on the print media and adjacent to an indicium area edge of the printed indicium area is smaller than the required size of the quiet zone area as indicated by the quiet zone requirement (for example, because the indicium area edge is too close to the print media edge), similar to those described above.

In some embodiments, the processor may determine a reduced quiet zone requirement, where the required size (for example, width) indicated by the reduced quiet zone requirement equals or is smaller than the size (for example, width) of the quiet zone area on the print media and adjacent to the indicium area edge of the printed indicium area as described above. When generating a quiet zone grade, the processor may determine that the quiet zone area adjacent to the indicium area edge satisfies the reduced quiet zone requirement.

Additionally, or alternatively, at step/operation 612, a processor (such as, but not limited to, the processor 202 of the printing apparatus 200 described above in connection with FIG. 2 and/or the verifier processor 309 of the system 300 described above in connection with FIG. 3) adds at least one additional quiet zone area to the at least one quiet zone area.

For example, when determining that the at least one quiet zone area does not satisfy at least one quiet zone requirement at step/operation 608, the processor may determine that a size of a quiet zone area on the print media and adjacent to an indicium area edge of the printed indicium area is smaller than the required size of the quiet zone area as indicated by the quiet zone requirement (for example, because the indicium area edge is too close to the print media edge), similar to those described above.

Figure 10B:
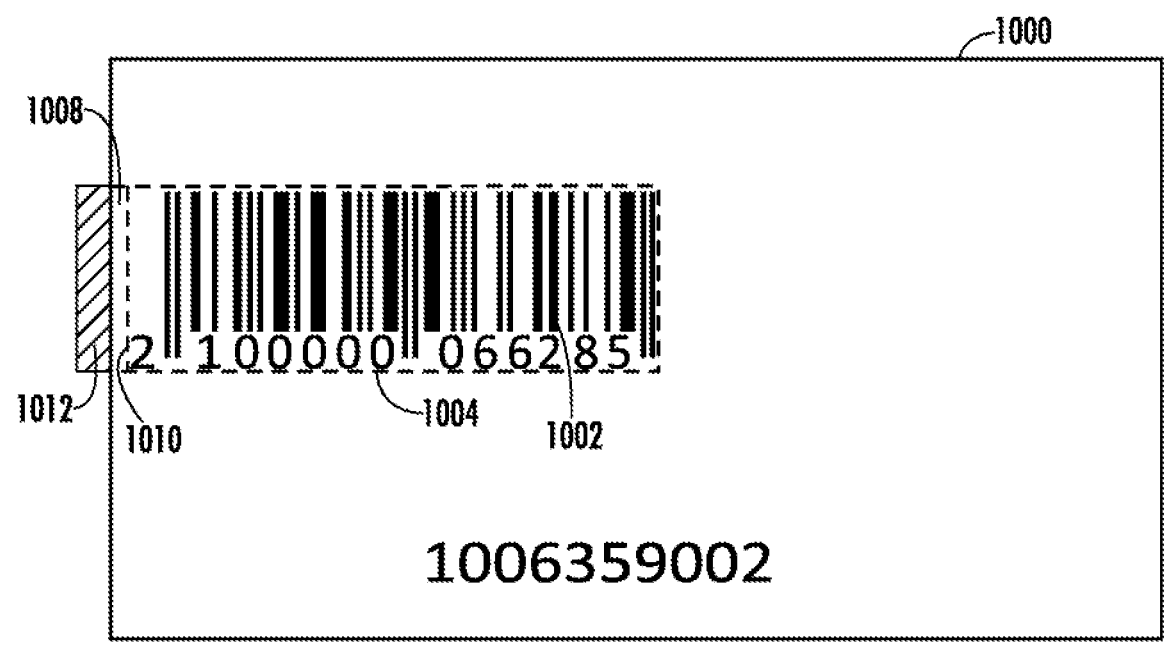
FIG. 10B illustrates an example captured image of an example print media and an additional quiet zone area in accordance with some embodiments of the present disclosure.

In some embodiments, the processor may programmatically and artificially add an additional quiet zone area (e.g. a black space) to the at least one quiet zone area in the quiet zone grade portion on the print media. For example, referring now to FIG. 10B, the processor may determine that the printed indicium area 1004 does not satisfy a quiet zone requirement because the size of the left quiet zone area 1008 on the print media and adjacent to a left indicium area edge 1010 of the printed indicium area 1004 is smaller than the required size of the quiet zone area as indicated by the quiet zone requirement. In some embodiments, the processor may programmatically add an additional quiet zone area 1012 (e.g. a black space) to the left quiet zone area 1008 that extends the left quiet zone area 1008. As shown in FIG. 10B, the additional quiet zone area 1012 connects to and expands from the left quiet zone area 1008 (e.g. expands the print media as shown in the captured image 1000).

In some embodiments, the processor may determine a size of additional quiet zone area 1012 so that the combine size of the additional quiet zone area 1012 and the left quiet zone area 1008 equals or is larger than the required size of the quiet zone area as indicated by the quiet zone requirement. When generating a quiet zone grade, the processor may compare the combine size of the additional quiet zone area 1012 and the left quiet zone area 1008 with the required size, and may determine that the quiet zone area (including the artificially added quiet zone area) adjacent to the left indicium area edge 1010 satisfies the quiet zone requirement.

Referring back to FIG. 6, subsequent to and/or in response to step/operation 610 and step/operation 612, the example method 600 proceeds to step/operation 614. At step/operation 614, a processor (such as, but not limited to, the processor 202 of the printing apparatus 200 described above in connection with FIG. 2 and/or the verifier processor 309 of the system 300 described above in connection with FIG. 3) generates at least one quiet zone grade associated with the at least one quiet zone area.

In some embodiments, the process generates at least one quiet zone grade associated with the at least one quiet zone area based at least in part on at least one of the at least one reduced quiet zone requirement described above in connection with step/operation 610 and/or the at least one additional quiet zone area described above in connection with step/operation 612.

For example, subsequent to the processor determining that a user input providing an overwrite quiet zone requirement indication is received at step/operation 606 and that at least one quiet zone area does not satisfy the corresponding quiet zone area requirement at step/operation 608, the processor adjusts the at least one quiet zone requirement to at least one reduced quiet zone requirement at step/operation 610. Even though the processor may determine that an actual size of the quiet zone area adjacent to an indicium area edge is less than the required size as indicated by the quiet zone requirement at step/operation 608, the processor may determine that the size of the quiet zone area equals or is larger than the reduced required size of the reduced quiet zone requirement at step/operation 614. As such, the processor may determine that the quiet zone area satisfies the reduced quiet zone requirement, and may generate a quiet zone grade indicating that the quiet zone area associated with the indicium area edge of the printed indicium area safeties the applicable quiet zone requirement (e.g. a passing grade).

Additionally, or alternatively, subsequent to the processor determining that a user input providing an overwrite quiet zone requirement indication is received at step/operation 606 and that at least one quiet zone area does not satisfy the corresponding quiet zone area requirement at step/operation 608, the processor adds an additional quiet zone to the at least one quiet zone in the quiet zone grade portion at step/operation 612. Even though the processor may determine that a size of the quiet zone area associated with an indicium area edge is less than the required size as indicated by the quiet zone requirement at step/operation 608, the processor may determine that the combined size of the quiet zone area and the additional quiet zone area equals or is larger than the required size according to the quiet zone requirement at step/operation 614. As such, the processor may determine that the printed indicium satisfies the quiet zone requirement, and may generate a quiet zone grade indicating that the quiet zone area associated with the indicium area edge of the printed indicium area safeties the applicable quiet zone requirement (e.g. a passing grade).

Referring back to FIG. 6, subsequent to and/or in response to step/operation 614, the example method 600 proceeds to step/operation 616. At step/operation 616, a processor (such as, but not limited to, the processor 202 of the printing apparatus 200 described above in connection with FIG. 2 and/or the verifier processor 309 of the system 300 described above in connection with FIG. 3) outputs verification results associated with the printed indicium.

In some embodiments, the verification results associated with the printed indicium is based at least in part on the at least one quiet zone grade generated at step/operation 614. For example, the verification results may comprise a quiet zone verification result indicating whether the printed indicium satisfies the applicable quiet zone requirements. In some embodiments, the quiet zone verification result may be generated based on one or more quiet zone grades associated with one or more quiet zone areas that are adjacent to one or more indicium area edges of the printed indicium.

In some embodiments, if all the quiet zone grades of all the quiet zone areas indicate passing grades, the processor may generate a quiet zone verification result indicating that the printed indicium satisfies the applicable quiet zone requirements. In some embodiments, if at least one of the quiet zone grades does not indicate a passing grade (e.g. indicating a failing grade), the processor may generate a quiet zone verification result indicating that the printed indicium does not satisfy the applicable quiet zone requirements.

As described above in connection with step/operation 614, the processor may generate a passing grade for a quiet zone area associated with an indicium area edge that does not satisfy the quiet zone area requirement (1) in response to receiving user input providing an overwrite quiet zone requirement indication at step/operation 606 and (2) subsequently adjusting the quiet zone requirement to a reduced quiet zone requirement for the quiet zone area associated with the indicium area edge at step/operation 610 and/or adding an additional quiet zone area to the quiet zone area associated with the indicium area edge in the quiet zone grade portion at step/operation 612. In such an example, the quiet zone verification result may indicate that it is based on an overwritten quiet zone requirement (associated with step/operation 610) or an overwritten quiet zone that is adjacent to the indicium area edge (associated with step/operation 612).

For example, if the processor adjusts the quiet zone requirement associated with the quiet zone area to the left side of the printed indicium to a reduced quiet zone requirement, the quiet zone verification result generated by the processor may indicate that it is based on an overwritten quiet zone requirement associated with the quiet zone area to the left side of the printed indicium. Additionally, or alternatively, if the processor adds an additional quiet zone area to the quiet zone area that is to the left side of the printed indicium, the quiet zone verification result generated by the processor may indicate that it is based on an overwritten quiet zone adjacent to the left side of the printed indicium.

In some embodiments, the verification results may be displayed on a user interface on a GUI (for example, the user interface component 103 described above in connection with FIG. 1A to FIG. 1C) of an example printing apparatus. In some embodiments, the verification results may be printed on a print media by the example printing apparatus.

Referring back to FIG. 6, if, at step/operation 606, the processor determines that the user input does not provide an overwrite quiet zone requirement indication, the example method 600 proceeds to step/operation 614.

In such an example, a processor (such as, but not limited to, the processor 202 of the printing apparatus 200 described above in connection with FIG. 2 and/or the verifier processor 309 of the system 300 described above in connection with FIG. 3) generates at least one quiet zone grade associated with the at least one quiet zone area without adjusting the quiet zone requirement to a reduced quiet zone requirement and without adding an additional quiet zone to the at least one quiet zone. Subsequently, the processor outputs the verification results associated with the printed indicium at step/operation 616.

Referring back to FIG. 6, if, at step/operation 608, the processor determines that every quiet zone area satisfies the corresponding quiet zone requirement, the example method 600 proceeds to step/operation 614.

In such an example, a processor (such as, but not limited to, the processor 202 of the printing apparatus 200 described above in connection with FIG. 2 and/or the verifier processor 309 of the system 300 described above in connection with FIG. 3) generates a quiet zone grade associated with the printed indicium without adjusting the quiet zone requirement to a reduced quiet zone requirement and without adding an additional quiet zone to the at least one quiet zone. In some embodiments, the quiet zone grade indicates a passing grade. Subsequently, the processor outputs the verification results associated with the printed indicium at step/operation 616.

Referring back to FIG. 6, subsequent to and/or in response to step/operation 616, the example method 600 proceeds to step/operation block B. As illustrated in FIG. 4, block B returns to step/operation 408. In some embodiments, an example method in accordance with various embodiments of the present disclosure may carry out other verifications on the printed indicium in addition to those example verifications illustrated in FIG. 6.

Figure 7:
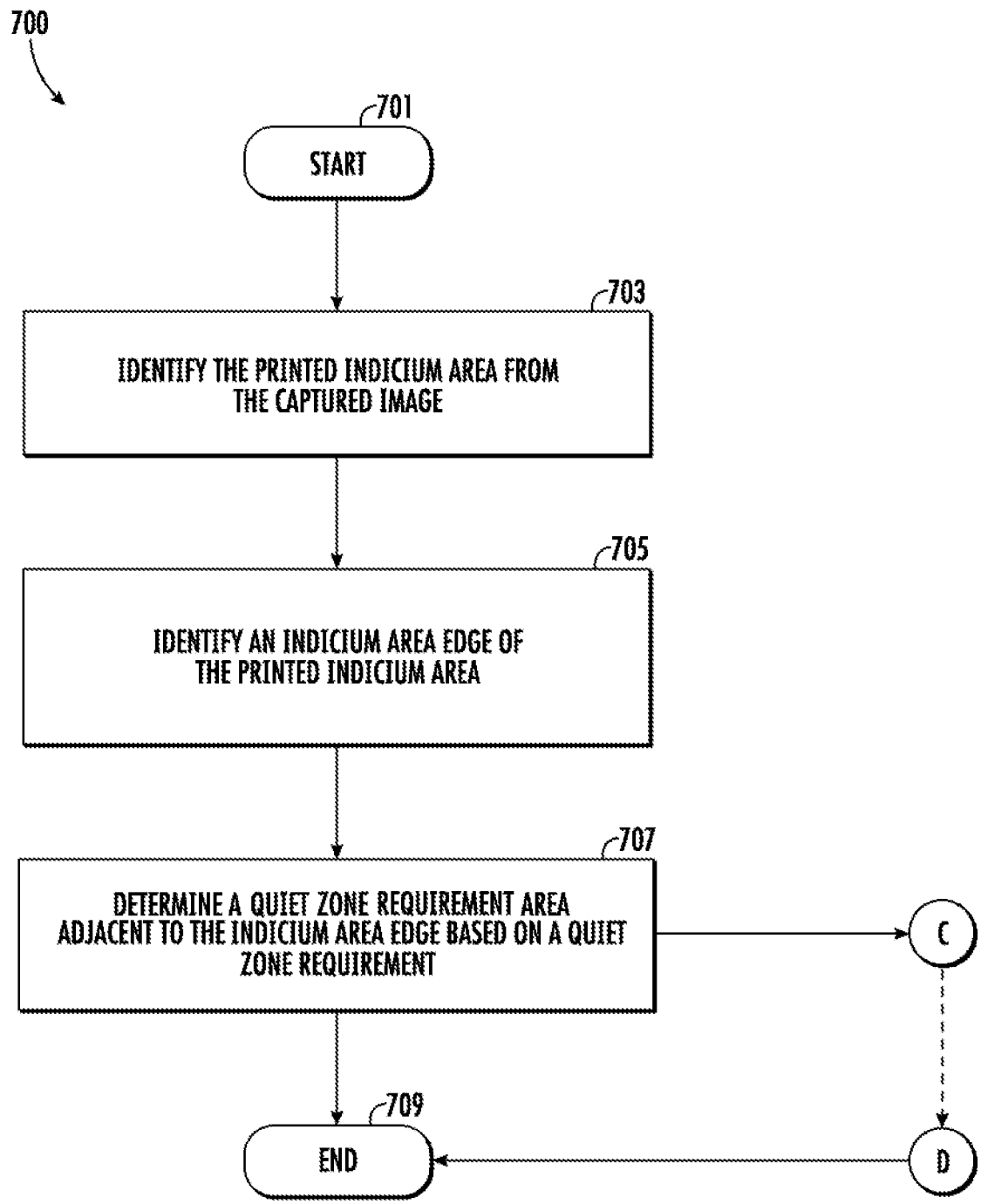
FIG. 7 is an example flow diagram illustrating an example method of processing an example captured image of an example print media in accordance with some embodiments of the present disclosure.

Referring now to FIG. 7, an example flow diagram illustrating an example method 700 of processing an example captured image of an example print media is illustrated. Similar to the example method 600 described above in connection with FIG. 6, the example method 700 may be part of verifying the printed indicium (e.g. the processor carries out the example method 700 during verifying the printed indicium for verification purposes).

The example method 700 starts at step/operation 701. In some embodiments, subsequent to and/or in response to step/operation 701, the example method 700 proceeds to step/operation 703. At step/operation 703, a processor (such as, but not limited to, the processor 202 of the printing apparatus 200 described above in connection with FIG. 2 and/or the verifier processor 309 of the system 300 described above in connection with FIG. 3) identifies the printed indicium area from the captured image.

For example, the processor may receive a captured image that comprises a printed indicium area, similar to those described above in connection with at least step/operation 602 of FIG. 6.

In some embodiments, to identify the printed indicium area from the captured image, the processor may retrieve data in the print job from the example printing apparatus. As described above, the example printing apparatus may print the indicium on the print media based on the print job. In some embodiments, data in the print job may indicate a type and/or content of the indicium that is printed on the print media.

In some embodiments, based on the data in the print job, the processor may perform image processing analysis (for example, pattern matching, edge detection, and/or the like) on the captured image to identify the printed indicium in the captured image. In some embodiments, after the processor identifies the printed indicium in the captured image, the processor may identify the printed indicium area from the captured image. For example, the processor may add buffer space surrounding the printed indicium to generate the printed indicium area, similar to those described above in connection with at least step/operation 604 of FIG. 6.

Referring back to FIG. 7, subsequent to and/or in response to step/operation 703, the example method 700 proceeds to step/operation 705. At step/operation 705, a processor (such as, but not limited to, the processor 202 of the printing apparatus 200 described above in connection with FIG. 2 and/or the verifier processor 309 of the system 300 described above in connection with FIG. 3) identifies an indicium area edge of the printed indicium area.

In the present disclosure, the term "indicium area edge" refers to an edge of the printed indicium area, similar to those described above. In some embodiments, the processor may identify all indicium area edges of the printed indicium area.

In some embodiments, the processor may identify an indicium area edge of the printed indicium area by utilizing edge detection techniques. For example, referring now to FIG. 10A, the processor may identify a top indicium area edge 1014 of the printed indicium area 1004, a bottom indicium area edge 1018 of the printed indicium area 1004, a left indicium area edge 1010 of the printed indicium area 1004, and a right indicium area edge 1016 of the printed indicium area 1004.

Referring back to FIG. 7, subsequent to and/or in response to step/operation 705, the example method 700 proceeds to step/operation 707. At step/operation 707, a processor (such as, but not limited to, the processor 202 of the printing apparatus 200 described above in connection with FIG. 2 and/or the verifier processor 309 of the system 300 described above in connection with FIG. 3) determines a quiet zone requirement area adjacent to the indicium area edge based on a quiet zone requirement.

In some embodiments, a size of the quiet zone requirement area may be determined based on the required size of the quiet zone according to the quiet zone requirement. In some embodiments, a portion of the quiet zone requirement area that is determined at step/operation 707 may not be on the print media.

For example, referring now to FIG. 10A, the processor may determine a size of a left quiet zone requirement area 1020 adjacent to the left indicium area edge 1010 based at least in part on a left quiet zone requirement that corresponds to the left quiet zone area. In some embodiments, the size of the left quiet zone requirement area 1020 equals the required size as indicated by the left quiet zone requirement. In the example shown in FIG. 10A, the left quiet zone requirement area 1020 comprises the left quiet zone area 1008 and an area that is not on the print media (e.g. an area that is to the left of the print media edge 1028).

Additionally, or alternatively, the processor may determine a size of a right quiet zone requirement area adjacent to the right indicium area edge 1016 based at least in part on a right quiet zone requirement associated with the right quiet zone area. In some embodiments, the size of the right quiet zone requirement area equals the required size as indicated by the right quiet zone requirement.

In some embodiments, if the printed indicium is a one dimensional barcode, a quiet zone is at the start of the one dimensional barcode and another quiet zone is at the end of the barcode (for example, at the left end and at the right end of the printed indicium if it is printed in horizontal orientation as shown in FIG. 10A). In some embodiments, there is no quiet zone at the top of or at the bottom of one dimensional barcode.

In some embodiments, if the printed indicium is a two dimensional (2D) barcode, there are quite zones all around the 2D barcode (for example, at the top, at the bottom, at the left, and at the right). In some embodiments, a 2D barcode may not have quiet zones all around (for example, only quiet zones at left and at right and without quiet zones at top or at bottom).

Referring back to FIG. 7, subsequent to and/or in response to step/operation 707, the example method 700 proceeds to step/operation 709 and ends.

In some example embodiments, subsequent to determining a quiet zone requirement area adjacent to the indicium area edge based on a quiet zone requirement at step/operation 707, various example methods in accordance with such example embodiments may comprise one or more additional steps/operations. Such example steps/operations include, but are not limited to, the example method 800 illustrated in FIG. 8 and the example method 900 illustrated in FIG. 9.

Figure 8:
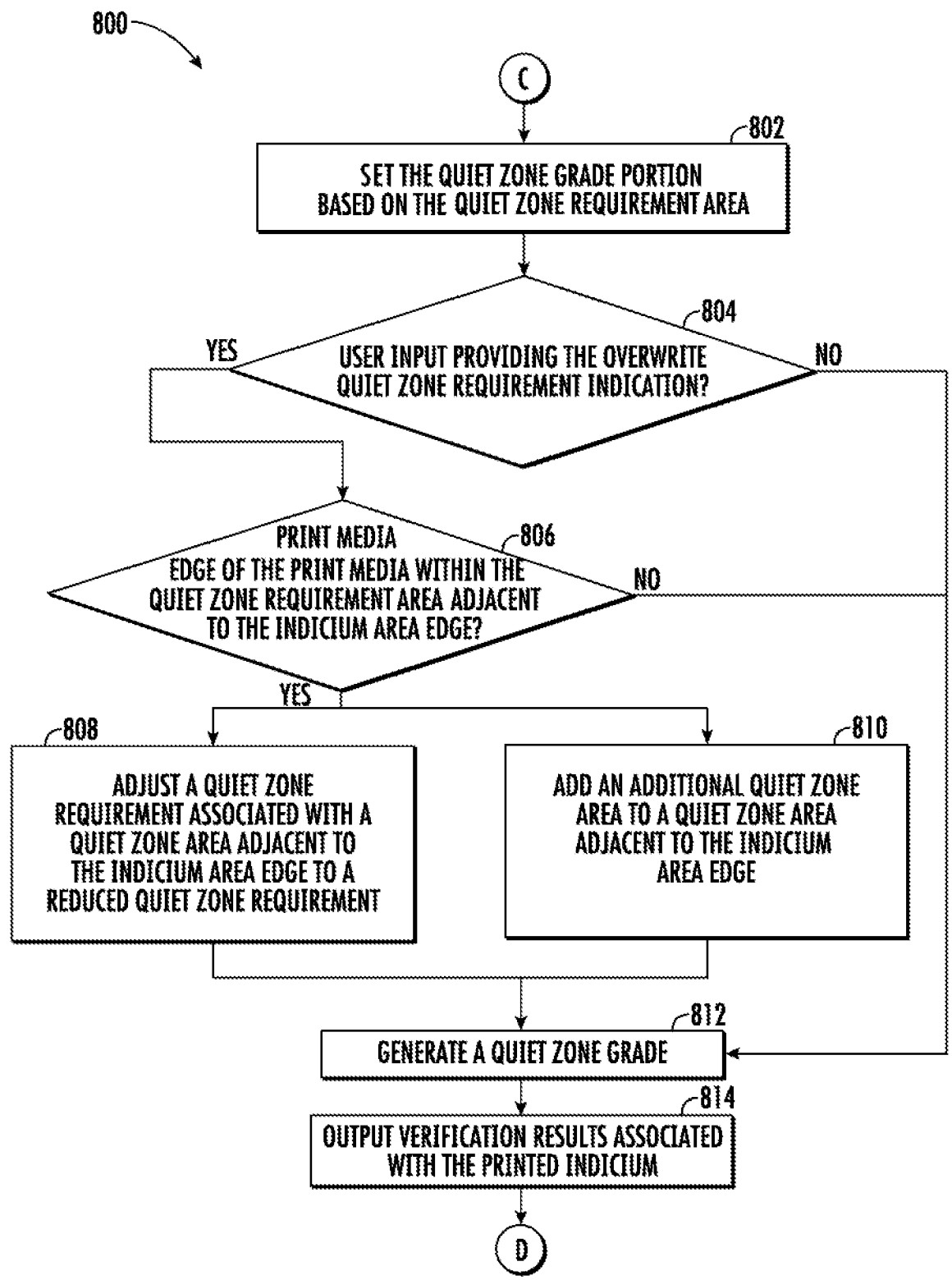
FIG. 8 is an example flow diagram illustrating an example method of generating a quiet zone grade of the printed indicium in accordance with some embodiments of the present disclosure.

Referring now to FIG. 8, an example flow diagram illustrating an example method 800 of generating a quiet zone grade of the printed indicium is illustrated.

The example method 800 starts at block C from FIG. 7. As illustrated in FIG. 7, block C is connected to step/operation 707, where the processor determines a quiet zone requirement area adjacent to the indicium area edge based on a quiet zone requirement.

In some embodiments, subsequent to and/or in response to block C, (e.g. subsequent to and/or in response to step/operation 707), the example method 800 proceeds to step/operation 802. At step/operation 802, a processor (such as, but not limited to, the processor 202 of the printing apparatus 200 described above in connection with FIG. 2 and/or the verifier processor 309 of the system 300 described above in connection with FIG. 3) sets the quiet zone grade portion based on the quiet zone requirement area.

For example, as shown in FIG. 10A, the processor may determine that the quiet zone grade portion 1006 comprises the left quiet zone requirement area 1020 and the right quiet zone requirement area (which may be the right quiet zone area 1022 if a size of right quiet zone area 1022 matches the required size as indicated by the corresponding quiet zone requirement). In addition, the quiet zone grade portion 1006 comprises the printed indicium area 1004 as described above.

Referring back to FIG. 8, subsequent to and/or in response to step/operation 802, the example method 800 proceeds to step/operation 804. At step/operation 804, a processor (such as, but not limited to, the processor 202 of the printing apparatus 200 described above in connection with FIG. 2 and/or the verifier processor 309 of the system 300 described above in connection with FIG. 3) determines whether a user input providing an overwrite quiet zone requirement indication is received.

In some embodiments, the processor may determine whether a user input providing an overwrite quiet zone requirement indication is received similar to those described in connection with at least step/operation 606 of FIG. 6.

Referring back to FIG. 8, if, at step/operation 804, the processor determines that the user input providing an overwrite quiet zone requirement indication is received, the example method 800 proceeds to step/operation 806. At step/operation 806, a processor (such as, but not limited to, the processor 202 of the printing apparatus 200 described above in connection with FIG. 2 and/or the verifier processor 309 of the system 300 described above in connection with FIG. 3) determines whether a print media edge of the print media is within the quiet zone requirement area adjacent to the indicium area edge.

As described above in connection with FIG. 7, the processor may identify an indicium area edge of the printed indicium area at step/operation 705 and determine a quiet zone requirement area adjacent to that indicium area edge based on a quiet zone requirement at step/operation 707. In some embodiments, in response to determining that the user input providing the overwrite quiet zone requirement indication is received at step/operation 804 of FIG. 8, the processor proceeds with determining whether a print media edge of the print media is within the quiet zone requirement area adjacent to that indicium area edge at step/operation 806.

In some embodiments, the processor may determine whether a print media edge is within the quiet zone requirement area based on edge detection techniques. For example, as shown in FIG. 10A, the processor may determine that no print media edge of the print media is within the right quiet zone requirement area (which may correspond to the right quiet zone area 1022 as described above). The processor may determine that a print media edge of the print media is within the left quiet zone requirement area 1020.

While the description above provides an example of determining whether a print media edge of the print media is within the quiet zone requirement area, it is noted that the scope of the present disclosure is not limited to the description above. In some examples, an example processor may additionally, or alternatively, determine whether at least one text, character, mark or obstacle is within the quiet zone requirement area. In some embodiments, an example processor may determine whether the quiet zone requirement area is a blank space.

Referring back to FIG. 8, if, at step/operation 806, the processor determines that the at least one print media edge of the print media is within the quiet zone requirement area adjacent to the indicium area edge, the example method 800 proceeds to step/operation 808 and/or step/operation 810.

As described above in connection with at least step/operation 707 of FIG. 7, the quiet zone requirement area adjacent to the indicium area edge is determined based on the quiet zone requirement. If at least one print media edge of the print media is within the quiet zone requirement area adjacent to the indicium area edge, or at least one text, character, mark or obstacle is within the quiet zone requirement area, or the quiet zone requirement area is not a blank space, the processor determines that the quiet zone area adjacent to the indicium area edge does not satisfy the corresponding quiet zone requirement.

In some embodiments, in response to receiving a user input providing an overwrite quiet zone requirement indication at step/operation 804, the processor may cause at least one of adjusting a quiet zone requirement associated with a quiet zone area adjacent to the indicium area edge to a reduced quiet zone requirement or adding an additional quiet zone area to a quiet zone area adjacent to the indicium area edge.

For example, at step/operation 808, a processor (such as, but not limited to, the processor 202 of the printing apparatus 200 described above in connection with FIG. 2 and/or the verifier processor 309 of the system 300 described above in connection with FIG. 3) adjusts the quiet zone requirement associated with a quiet zone area adjacent to the indicium area edge to a reduced quiet zone requirement associated with the quiet zone area adjacent to the indicium area.

For example, in response to determining that at least one print media edge of the print media is within the quiet zone requirement area adjacent to the indicium area edge at step/operation 806, the processor adjusts the quiet zone requirement associated with the quiet zone area adjacent to the indicium area, similar to those described above in connection with step/operation 610 of FIG. 6.

In some embodiments, the quiet zone requirement associated with the indicium area edge may indicate a required size of a quiet zone area on the print media adjacent to the indicium area edge. In some embodiments, when adjusting the quiet zone requirement associated with the quiet zone area adjacent to the indicium area to a reduced quiet zone requirement, the processor may reduce the required size of a quiet zone area based at least in part on the distance between the indicium area edge and at least one print media edge of the print media within the quiet zone requirement area.

For example, the processor may determine a current size of a quiet zone area on the print media that is adjacent to the indicium area edge. In some embodiments, the current size of a quiet zone area may be based on a distance/width between at least one print media edge of the print media within the quiet zone requirement area and the indicium area edge. In such an example, the processor may reduce the required size of the quiet zone area to a size that equals or is smaller than the current size of the quiet zone area. Additional details associated with determining a quiet zone area are described herein, including, but not limited to, those described in connection with at least FIG. 9 to FIG. 10B.

Subsequent to and/or in response to step/operation 808, the example method 800 proceeds to step/operation 812. At step/operation 812, a processor (such as, but not limited to, the processor 202 of the printing apparatus 200 described above in connection with FIG. 2 and/or the verifier processor 309 of the system 300 described above in connection with FIG. 3) generates the quiet zone grade.

In particular, the processor generates the quiet zone grade for the quiet zone area adjacent to the indicium area edge based at least in part on the reduced quiet zone requirement from step/operation 808, similar to those described herein in connection with at least step/operation 614 of FIG. 6.

For example, the processor may determine that the size of the quiet zone area adjacent to the indicium area edge equals or is larger than the reduced required size of the reduced quiet zone requirement from step/operation 808. As such, the processor may determine that the quiet zone area adjacent to the indicium area edge satisfies the reduced quiet zone requirement, and may generate a quiet zone grade indicating that the quiet zone area adjacent to the indicium area edge is sufficient (e.g. a passing grade).

Referring back to FIG. 8, subsequent to and/or in response to step/operation 812, the example method 800 proceeds to step/operation 814. At step/operation 814, a processor (such as, but not limited to, the processor 202 of the printing apparatus 200 described above in connection with FIG. 2 and/or the verifier processor 309 of the system 300 described above in connection with FIG. 3) outputs verification results associated with the printed indicium.

For example, the processor may output the verification results similar to those described herein in connection with at least step/operation 616 of FIG. 6. For example, the verification results may comprise a quiet zone verification result indicating whether the printed indicium satisfies the applicable quiet zone requirements. In some embodiments, the quiet zone verification result may be generated based on one or more quiet zone grades associated with one or more quiet zone areas that are adjacent to one or more indicium area edges of the printed indicium or the printed indicium area (including but not limited to, at least the quiet zone grade generated at step/operation 812).

As described above in connection with at least step/operation 812, the processor may generate a passing grade for the quiet zone area adjacent to the indicium area edge based on a reduced quiet zone requirement. In such an example, the quiet zone verification result of the verification results may indicate that the quiet zone grade for the quiet zone area adjacent to the indicium area edge is associated with an overwritten quiet zone requirement for the quiet zone area adjacent to the indicium area edge.

Referring back to FIG. 8, in response to determining that the print media edge of the print media is within the quiet zone requirement area adjacent to the indicium area edge, the example method 800 additionally, or alternatively, proceeds to step/operation 810. At step/operation 810, a processor (such as, but not limited to, the processor 202 of the printing apparatus 200 described above in connection with FIG. 2 and/or the verifier processor 309 of the system 300 described above in connection with FIG. 3) adds an additional quiet zone area to a quiet zone area adjacent to the indicium area edge.

For example, in response to determining that at least one print media edge of the print media is within the quiet zone requirement area adjacent to the indicium area edge at step/operation 806, the processor adds an additional quiet zone area, similar to those described above in connection with step/operation 612 of FIG. 6.

In some embodiments, the processor may determine a current size of a quiet zone area on the print media that is adjacent to the indicium area edge. The processor may determine the size of the additional quiet zone area based on the current size of the quiet zone and the required size of the quiet zone area according to the quiet zone requirement. For example, the size of the additional quiet zone area may equal or be larger than a size difference between the required size of the quiet zone area and the current size of the quiet zone area. Additional details associated with determining a quiet zone area are described herein, including, but not limited to, those described in connection with at least FIG. 9 to FIG. 10B.

Subsequent to and/or in response to step/operation 810, the example method 800 proceeds to step/operation 812. At step/operation 812, a processor (such as, but not limited to, the processor 202 of the printing apparatus 200 described above in connection with FIG. 2 and/or the verifier processor 309 of the system 300 described above in connection with FIG. 3) generates the quiet zone grade.

In particular, the processor generates a quiet zone grade for the quiet zone area adjacent to the indicium area edge based at least in part on the additional quiet zone area from step/operation 810, similar to those described herein in connection with at least step/operation 614 of FIG. 6.

For example, the processor may determine that the combined size of the current quiet zone area adjacent to the indicium area edge and the additional quiet zone area from step/operation 810 equals or is larger than the required size of the quiet zone requirement. As such, the processor may determine that the quiet zone area adjacent to the indicium area edge satisfies the quiet zone requirement, and may generate a quiet zone grade indicating that the quiet zone area is sufficient (e.g. a passing grade).

Referring back to FIG. 8, subsequent to and/or in response to step/operation 812, the example method 800 proceeds to step/operation 814. At step/operation 814, a processor (such as, but not limited to, the processor 202 of the printing apparatus 200 described above in connection with FIG. 2 and/or the verifier processor 309 of the system 300 described above in connection with FIG. 3) outputs verification results associated with the printed indicium.

For example, the processor may output the verification results similar to those described herein in connection with at least step/operation 616 of FIG. 6. For example, the verification results may comprise a quiet zone verification result indicating whether the printed indicium satisfies the applicable quiet zone requirements. In some embodiments, the quiet zone verification result may be generated based on one or more quiet zone grades associated with one or more quiet zone areas that are adjacent to one or more indicium area edges of the printed indicium (including but not limited to, at least the quiet zone grade generated at step/operation 812).

As described above in connection with at least step/operation 812, the processor may generate a passing grade for the quiet zone area adjacent to the indicium area edge based on the additional quiet zone area. In such an example, the quiet zone verification result may indicate that the quiet zone grade for the quiet zone area adjacent to the indicium area edge is associated with an overwritten quiet zone (e.g. the current quiet zone area associated with the indicium area edge has been overwritten to include the additional quiet zone area).

Referring back to FIG. 8, if, at step/operation 804, the processor determines that the user input does not provide an overwrite quiet zone requirement indication, the example method 800 proceeds to step/operation 812.

In such an example, a processor (such as, but not limited to, the processor 202 of the printing apparatus 200 described above in connection with FIG. 2 and/or the verifier processor 309 of the system 300 described above in connection with FIG. 3) generates a quiet zone grade associated with the quiet zone area adjacent to the indicium area edge described above in connection with at least step/operation 705 of FIG. 7 without adjusting a quiet zone requirement associated with a quiet zone area adjacent to the indicium area edge to a reduced quiet zone requirement and without adding an additional quiet zone area to a quiet zone area adjacent to the indicium area edge. In other words, the processor generates quiet zone grades for quiet zone areas per usual. Subsequently, the processor outputs the verification results associated with the printed indicium at step/operation 812.

Referring back to FIG. 8, if, at step/operation 806, the processor determines that the print media edge of the print media is not within the quiet zone requirement area adjacent to the indicium area edge, the example method 800 proceeds to step/operation 812.

As described above in connection with FIG. 7, the processor may identify an indicium area edge of the printed indicium area at step/operation 705 and determine a quiet zone requirement area adjacent to that indicium area edge based on a quiet zone requirement at step/operation 707. If the print media edge of the print media is not within the quiet zone requirement area adjacent to the indicium area edge, and/or texts, characters, marks and/or obstacles are not within the quiet zone requirement area, and/or or the quiet zone requirement area is a blank space, the processor determines that the quiet zone area adjacent to the indicium area edge satisfies the corresponding quiet zone requirement. In such an example, a processor (such as, but not limited to, the processor 202 of the printing apparatus 200 described above in connection with FIG. 2 and/or the verifier processor 309 of the system 300 described above in connection with FIG. 3) generates a quiet zone grade indicating that a quiet zone area associated with the indicium area edge satisfies the quiet zone requirement. (e.g. without adjusting a quiet zone requirement associated with a quiet zone area adjacent to the indicium area edge to a reduced quiet zone requirement and without adding an additional quiet zone area to a quiet zone area adjacent to the indicium area edge).

Subsequently, the processor outputs the verification results associated with the printed indicium at step/operation 812. In some embodiments, the verification results indicate that the quiet zone grade is not associated with an overwritten quiet zone requirement and is not associated with an overwritten quiet zone adjacent to the indicium area edge.

Referring back to FIG. 8, subsequent to and/or in response to step/operation 814, the example method 800 proceeds to step/operation block D. As illustrated in FIG. 7, block D returns to step/operation 709 and ends.

Figure 9:
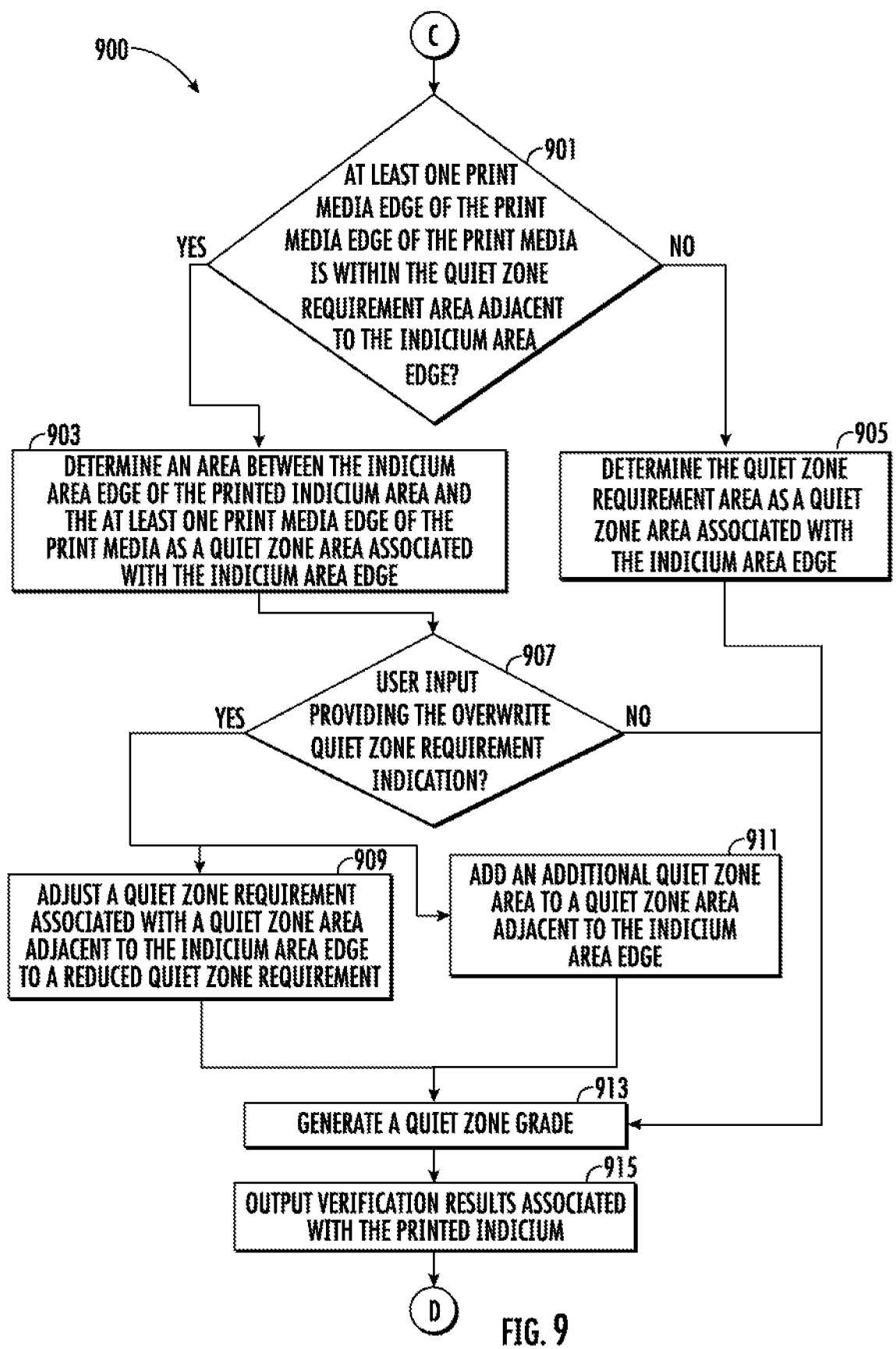
FIG. 9 is an example flow diagram illustrating an example method of generating a quiet zone grade of the printed indicium in accordance with some embodiments of the present disclosure.

Referring now to FIG. 9, an example flow diagram illustrating an example method 900 of generating a quiet zone grade of the printed indicium is illustrated.

The example method 900 starts at block C. As illustrated in FIG. 7, block C is connected to step/operation 707, where the processor determines a quiet zone requirement area adjacent to the indicium area edge based on a quiet zone requirement.

In some embodiments, subsequent to and/or in response to block C, the example method 900 proceeds to step/operation 901. At step/operation 901, a processor (such as, but not limited to, the processor 202 of the printing apparatus 200 described above in connection with FIG. 2 and/or the verifier processor 309 of the system 300 described above in connection with FIG. 3) determines whether at least one print media edge of the print media is within the quiet zone requirement area adjacent to the indicium area edge, similar to step/operation 806 described above in connection with FIG. 8.

Referring back to FIG. 9, if, at step/operation 901, the processor determines that at least one print media edge of the print media is within the quiet zone requirement area, the example method 900 proceeds to step/operation 903. At step/operation 903, a processor (such as, but not limited to, the processor 202 of the printing apparatus 200 described above in connection with FIG. 2 and/or the verifier processor 309 of the system 300 described above in connection with FIG. 3) determines an area between the indicium area edge of the printed indicium area and the at least one print media edge of the print media as a quiet zone area associated with the indicium area edge.

For example, referring now to FIG. 10A, the processor may determine that at least one print media edge 1028 of the print media is within the left quiet zone requirement area 1020. In response to determining that the at least one print media edge 1028 of the print media is within the left quiet zone requirement area 1020, the processor determines a left quiet zone area associated with the left indicium area edge 1010 as the area between the left indicium area edge 1010 of the printed indicium area 1004 and the print media edge 1028 of the print media (e.g. the left quiet zone area 1008).

Additionally, or alternatively, the processor may determine whether the area between the left indicium area edge 1010 of the printed indicium area 1004 and the at least one print media edge 1028 of the print media comprises any texts, characters, marks or obstacles. If not, the processor determines such area as the quiet zone area associated with the left indicium area edge 1010. If so, the processor determines the largest area on the print media that is adjacent to left indicium area edge 1010 and does not comprise any texts, characters, marks or obstacles as the quiet zone area associated with the left indicium area edge 1010.

As described above in connection with at least step/operation 707 of FIG. 7, the quiet zone requirement area adjacent to the indicium area edge is determined based on the quiet zone requirement. If the processor determines that at least one print media edge of the print media is within the quiet zone requirement area adjacent to the indicium area edge, the processor determines that the quiet zone area adjacent to the indicium area edge does not satisfy the corresponding quiet zone requirement Referring back to FIG. 9, subsequent to and/or in response to step/operation 903, the example method 900 proceeds to step/operation 907. At step/operation 907, a processor (such as, but not limited to, the processor 202 of the printing apparatus 200 described above in connection with FIG. 2 and/or the verifier processor 309 of the system 300 described above in connection with FIG. 3) determines whether a user input providing an overwrite quiet zone requirement indication is received, similar to those described herein in connection with at least step/operation 606 of FIG. 6 and/or step/operation 804 of FIG. 8.

If, at step/operation 907, the processor determines that user input providing an overwrite quiet zone requirement indication is received, the example method 900 proceeds to step/operation 909 and/or step/operation 911.

For example, at step/operation 909, a processor (such as, but not limited to, the processor 202 of the printing apparatus 200 described above in connection with FIG. 2 and/or the verifier processor 309 of the system 300 described above in connection with FIG. 3) adjusts a quiet zone requirement associated with a quiet zone area adjacent to the indicium area edge to a reduced quiet zone requirement, similar to those described herein in connection with at least step/operation 610 of FIG. 6 and step/operation 808 of FIG. 8.

Additionally, or alternatively, at step/operation 911, a processor (such as, but not limited to, the processor 202 of the printing apparatus 200 described above in connection with FIG. 2 and/or the verifier processor 309 of the system 300 described above in connection with FIG. 3) adds an additional quiet zone area to a quiet zone area adjacent to the indicium area edge, similar to those described herein in connection with at least step/operation 612 of FIG. 6 and step/operation 810 of FIG. 8.

Referring back to FIG. 9, subsequent to and/or in response to step/operation 909 and step/operation 911, the example method 900 proceeds to step/operation 913. At step/operation 913, a processor (such as, but not limited to, the processor 202 of the printing apparatus 200 described above in connection with FIG. 2 and/or the verifier processor 309 of the system 300 described above in connection with FIG. 3) generates the quiet zone grade, similar to those described herein in connection with at least step/operation 614 of FIG. 6 and step/operation 812 of FIG. 8.

Referring back to FIG. 9, subsequent to and/or in response to step/operation 913, the example method 900 proceeds to step/operation 915. At step/operation 915, a processor (such as, but not limited to, the processor 202 of the printing apparatus 200 described above in connection with FIG. 2 and/or the verifier processor 309 of the system 300 described above in connection with FIG. 3) outputs verification results associated with the printed indica, similar to those described herein in connection with at least step/operation 616 of FIG. 6 and step/operation 814 of FIG. 8.

Referring back to FIG. 9, if, at step/operation 901, the processor determines that no print media edge of the print media is within the quiet zone requirement area, the example method 900 proceeds to step/operation 905. At step/operation 905, a processor (such as, but not limited to, the processor 202 of the printing apparatus 200 described above in connection with FIG. 2 and/or the verifier processor 309 of the system 300 described above in connection with FIG. 3) determines the quiet zone requirement area as a quiet zone area associated with the indicium area edge.

For example, referring now to FIG. 10A, the processor may determine that no print media edge of the print media is within the right quiet zone requirement area. In response to determining that no print media edge of the print media is within the right quiet zone requirement area, the processor determines the right quiet zone requirement area as the right quiet zone area 1022 associated with the right indicium area edge 1016.

Additionally, or alternatively, the processor may determine whether the right quiet zone requirement area comprises any texts, characters, marks or obstacles. If not, the processor determines the right quiet zone requirement area as the right quiet zone area 1022 that is associated with the right indicium area edge 1016. If the right quiet zone requirement area comprises any texts, characters, marks or obstacles, the processor determines the largest area that is adjacent to right indicium area edge 1016 and does not comprise any texts, characters, marks or obstacles as the right quiet zone area 1022 that is associated with the right indicium area edge 1016.

As described above in connection with at least step/operation 707 of FIG. 7, the quiet zone requirement area adjacent to the indicium area edge is determined based on the quiet zone requirement. If the processor determines that no print media edge of the print media is within the quiet zone requirement area adjacent to the indicium area edge, the processor determines that the quiet zone area adjacent to the indicium area edge satisfies the corresponding quiet zone requirement.

Referring back to FIG. 9, subsequent to and/or in response to step/operation 905, the example method 900 proceeds to step/operation 913.

In such an example, a processor (such as, but not limited to, the processor 202 of the printing apparatus 200 described above in connection with FIG. 2 and/or the verifier processor 309 of the system 300 described above in connection with FIG. 3) generates a quiet zone grade associated with the quiet zone area adjacent to the indicium area edge described above in connection with at least step/operation 705 of FIG. 7 without adjusting a quiet zone requirement associated with a quiet zone area adjacent to the indicium area edge to a reduced quiet zone requirement and without adding an additional quiet zone area to a quiet zone area adjacent to the indicium area edge. In other words, the processor generates a quiet zone grade for the quiet zone area indicating that the quiet zone area satisfies the quiet zone requirement. Subsequently, the processor outputs the verification results associated with the printed indicium at step/operation 915.

Referring back to FIG. 9, if, at step/operation 907, the processor determines that the user input does not provide the overwrite quiet zone requirement indication, the example method 900 proceeds to step/operation 913.

In such an example, a processor (such as, but not limited to, the processor 202 of the printing apparatus 200 described above in connection with FIG. 2 and/or the verifier processor 309 of the system 300 described above in connection with FIG. 3) generates a quiet zone grade associated with the quiet zone area adjacent to the indicium area edge described above in connection with at least step/operation 705 of FIG. 7 without adjusting a quiet zone requirement associated with a quiet zone area adjacent to the indicium area edge to a reduced quiet zone requirement and without adding an additional quiet zone area to a quiet zone area adjacent to the indicium area edge. Subsequently, the processor outputs the verification results associated with the printed indicium at step/operation 915.

Referring back to FIG. 9, subsequent to and/or in response to step/operation 915, the example method 900 proceeds to step/operation block D. As illustrated in FIG. 7, block D returns to step/operation 709 and ends.

The foregoing detailed description has set forth various embodiments of the devices and/or processes via the use of block diagrams, flow charts, schematics, exemplary, and examples. Insofar as such block diagrams, flow charts, schematics, and examples contain one or more functions and/or operations, each function and/or operation within such block diagrams, flowcharts, schematics, or examples can be implemented, individually and/or collectively, by a wide range of hardware thereof.

In one embodiment, examples of the present disclosure may be implemented via Application Specific Integrated Circuits (ASICs). However, the embodiments disclosed herein, in whole or in part, can be equivalently implemented in standard integrated circuits, as one or more computer programs running on one or more computers (e.g., as one or more programs running on one or more computer systems), as one or more programs running on one or more processing circuitries (e.g., micro-processing circuitries), as one or more programs running on one or more processors (e.g., microprocessors), as firmware, or as virtually any combination thereof.

In addition, those skilled in the art will appreciate that example mechanisms disclosed herein may be capable of being distributed as a program product in a variety of tangible forms, and that an illustrative embodiment applies equally regardless of the particular type of tangible instruction bearing media used to actually carry out the distribution. Examples of tangible instruction bearing media include, but are not limited to, the following: recordable type media such as floppy disks, hard disk drives, CD ROMs, digital tape, flash drives, and computer memory.

The various embodiments described above can be combined with one another to provide further embodiments. For example, two or more of example embodiments described above may be combined to, for example, improve the safety of laser printing and reduce the risks associated with laser-related accidents and injuries. These and other changes may be made to the present systems and methods in light of the above detailed description. Accordingly, the disclosure is not limited by the disclosure, but instead its scope is to be determined by the following claims.

The invention claimed is:

1. A computer-implemented method for verifying a printed indicium comprising:
   receiving, by a processor of a printing apparatus, a captured image of a print media comprising the printed indicium;
   extracting, by the processor of the printing apparatus, a quiet zone grade portion from the captured image, wherein the quiet zone grade portion comprises a printed indicium area of the printed indicium and at least one quiet zone area adjacent to the printed indicium area;
   in response to receiving a user input providing an overwrite quiet zone requirement indication and determining that the at least one quiet zone area does not satisfy at least one quiet zone requirement:
      causing, by the processor of the printing apparatus, at least one of adjusting the at least one quiet zone requirement to at least one reduced quiet zone requirement or adding at least one additional quiet zone area to the at least one quiet zone area, and
      generating, by the processor of the printing apparatus, at least one quiet zone grade associated with the at least one quiet zone area based at least in part on at least one of the at least one reduced quiet zone requirement or the at least one additional quiet zone area; and
   outputting, by the processor of the printing apparatus, verification results associated with the printed indicium based at least in part on the at least one quiet zone grade.

2. The computer-implemented method of claim 1 further comprising:
   identifying the printed indicium area from the captured image;
   identifying an indicium area edge of the printed indicium area; and
   determining a quiet zone requirement area adjacent to the indicium area edge based on a quiet zone requirement.

3. The computer-implemented method of claim 2 further comprising:
   setting the quiet zone grade portion based on the quiet zone requirement area.

4. The computer-implemented method of claim 3 further comprising:
   in response to determining that the user input providing the overwrite quiet zone requirement indication is received, determining whether a print media edge of the print media is within the quiet zone requirement area adjacent to the indicium area edge.

5. The computer-implemented method of claim 4 further comprising:
   in response to determining that at least one print media edge of the print media is within the quiet zone requirement area adjacent to the indicium area edge:
      adjusting the quiet zone requirement associated with a quiet zone area adjacent to the indicium area edge to a reduced quiet zone requirement, and
      generating a quiet zone grade based at least in part on the reduced quiet zone requirement;
   wherein the verification results indicate that the quiet zone grade is associated with an overwritten quiet zone requirement.

6. The computer-implemented method of claim 4 further comprising:
   in response to determining that at least one print media edge of the print media is within the quiet zone requirement area adjacent to the indicium area edge:
      adding an additional quiet zone area to a quiet zone area adjacent to the indicium area edge, and
      generating a quiet zone grade based at least in part on the additional quiet zone area;
   wherein the verification results indicate that the quiet zone grade is associated with an overwritten quiet zone.

7. The computer-implemented method of claim 4 further comprising:
   in response to determining that the print media edge of the print media is not within the quiet zone requirement area adjacent to the indicium area edge, generating a quiet zone grade indicating that a quiet zone area associated with the indicium area edge satisfies the quiet zone requirement, wherein the verification results indicate that the quiet zone grade is not associated with an overwritten quiet zone requirement and is not associated with an overwritten quiet zone adjacent to the indicium area edge.

8. The computer-implemented method of claim 2 further comprising:
   determining whether at least one print media edge of the print media is within the quiet zone requirement area adjacent to the indicium area edge.

9. The computer-implemented method of claim 8 further comprising:
   in response to determining that the at least one print media edge of the print media is within the quiet zone requirement area, determining an area between the indicium area edge of the printed indicium area and the at least one print media edge of the print media as a quiet zone area associated with the indicium area edge.

10. The computer-implemented method of claim 8 further comprising:
    in response to determining that the at least one print media edge of the print media is not within the quiet zone requirement area, determining the quiet zone requirement area as a quiet zone area associated with the indicium area edge.

11. An apparatus for verifying a printed indicium, the apparatus comprising at least one processor and at least one non-transitory memory comprising program code, the at least one non-transitory memory and the program code configured to, with the at least one processor, cause the apparatus to at least:
    receive a captured image of a print media comprising the printed indicium;
    extract a quiet zone grade portion from the captured image, wherein the quiet zone grade portion comprises a printed indicium area of the printed indicium and at least one quiet zone area adjacent to the printed indicium area;
    in response to receiving a user input providing an overwrite quiet zone requirement indication and determining that the at least one quiet zone area does not satisfy at least one quiet zone requirement:
  cause at least one of adjusting the at least one quiet zone requirement to at least one reduced quiet zone requirement or adding at least one additional quiet zone area to the at least one quiet zone area, and
  generate at least one quiet zone grade associated with the at least one quiet zone area based at least in part on at least one of the at least one reduced quiet zone requirement or the at least one additional quiet zone area; and
output verification results associated with the printed indicium based at least in part on the at least one quiet zone grade.

12. The apparatus of claim 11, wherein the at least one non-transitory memory and the program code are configured to, with the at least one processor, cause the apparatus to:
identify the printed indicium area from the captured image;
identify an indicium area edge of the printed indicium area; and
determine a quiet zone requirement area adjacent to the indicium area edge based on a quiet zone requirement.

13. The apparatus of claim 12, wherein the at least one non-transitory memory and the program code are configured to, with the at least one processor, cause the apparatus to:
set that the quiet zone grade portion based on the quiet zone requirement area.

14. The apparatus of claim 13, wherein the at least one non-transitory memory and the program code are configured to, with the at least one processor, cause the apparatus to:
in response to determining that the user input providing the overwrite quiet zone requirement indication is received, determine whether a print media edge of the print media is within the quiet zone requirement area adjacent to the indicium area edge.

15. The apparatus of claim 14, wherein the at least one non-transitory memory and the program code are configured to, with the at least one processor, cause the apparatus to:
in response to determining that at least one print media edge of the print media is within the quiet zone requirement area adjacent to the indicium area edge:
  adjust the quiet zone requirement associated with a quiet zone area adjacent to the indicium area edge to a reduced quiet zone requirement, and
  generate a quiet zone grade based at least in part on the reduced quiet zone requirement;
wherein the verification results indicate that the quiet zone grade is associated with an overwritten quiet zone requirement.

16. The apparatus of claim 14, wherein the at least one non-transitory memory and the program code are configured to, with the at least one processor, cause the apparatus to:
in response to determining that at least one print media edge of the print media is within the quiet zone requirement area adjacent to the indicium area edge:
  add an additional quiet zone area to a quiet zone area adjacent to the indicium area edge, and
  generate a quiet zone grade based at least in part on the additional quiet zone area;
wherein the verification results indicate that the quiet zone grade is associated with an overwritten quiet zone.

17. The apparatus of claim 14, wherein the at least one non-transitory memory and the program code are configured to, with the at least one processor, cause the apparatus to:
in response to determining that the print media edge of the print media is not within the quiet zone requirement area adjacent to the indicium area edge, generate a quiet zone grade indicating that a quiet zone area associated with the indicium area edge satisfies the quiet zone requirement, wherein the verification results indicate that the quiet zone grade is not associated with an overwritten quiet zone requirement and is not associated with an overwritten quiet adjacent to the indicium area edge.

18. The apparatus of claim 12, wherein the at least one non-transitory memory and the program code are configured to, with the at least one processor, cause the apparatus to:
determine whether at least one print media edge of the print media is within the quiet zone requirement area adjacent to the indicium area edge.

19. The apparatus of claim 18, wherein the at least one non-transitory memory and the program code are configured to, with the at least one processor, cause the apparatus to:
in response to determining that the at least one print media edge of the print media is within the quiet zone requirement area, determine an area between the indicium area edge of the printed indicium area and the at least one print media edge of the print media as a quiet zone area associated with the indicium area edge.

20. A computer program product for verifying a printed indicium, the computer program product comprises at least one non-transitory computer-readable storage medium having computer-readable program code portions stored therein, the computer-readable program code portions comprising an executable portion configured to:
receive a captured image of a print media comprising the printed indicium;
extract a quiet zone grade portion from the captured image, wherein the quiet zone grade portion comprises a printed indicium area of the printed indicium and at least one quiet zone area adjacent to the printed indicium area;
in response to receiving a user input providing an overwrite quiet zone requirement indication and determining that the at least one quiet zone area does not satisfy at least one quiet zone requirement:
  cause at least one of adjusting the at least one quiet zone requirement to at least one reduced quiet zone requirement or adding at least one additional quiet zone area to the at least one quiet zone area, and
  generate at least one quiet zone grade associated with the at least one quiet zone area based at least in part on at least one of the at least one reduced quiet zone requirement or the at least one additional quiet zone area; and
output verification results associated with the printed indicium based at least in part on the at least one quiet zone grade.

* * * * *